US012764631B2

(12) United States Patent
Cheng

(10) Patent No.: US 12,764,631 B2
(45) Date of Patent: Oct. 13, 2026

(54) RELAY RESELECTION AND LINK RELEASE MESSAGING IN RELAY RESELECTION PROCEDURES

(71) Applicant: QUALCOMM Incorporated, San Diego, CA (US)

(72) Inventor: Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 736 days.

(21) Appl. No.: 18/041,128

(22) PCT Filed: Oct. 16, 2020

(86) PCT No.: PCT/CN2020/121471
§ 371 (c)(1),
(2) Date: Feb. 9, 2023

(87) PCT Pub. No.: WO2022/077432
PCT Pub. Date: Apr. 21, 2022

(65) Prior Publication Data
US 2023/0284116 A1 Sep. 7, 2023

(51) Int. Cl.
*H04W 40/22* (2009.01)
*H04W 8/00* (2009.01)
*H04W 48/20* (2009.01)
*H04W 76/14* (2018.01)
(Continued)

(52) U.S. Cl.
CPC ........... *H04W 40/22* (2013.01); *H04W 76/14* (2018.02); *H04W 76/30* (2018.02); *H04W 88/04* (2013.01)

(58) Field of Classification Search
CPC ..... H04W 40/22; H04W 76/14; H04W 76/30; H04W 88/04; H04W 48/20; H04W 8/005
See application file for complete search history.

(56) References Cited

U.S. PATENT DOCUMENTS

2017/0339606 A1* 11/2017 Kim ...................... H04W 36/22
2018/0152986 A1 5/2018 Jung et al.
2019/0289520 A1 9/2019 Xu et al.
(Continued)

FOREIGN PATENT DOCUMENTS

CN 106888494 A 6/2017
CN 110876175 A 3/2020

OTHER PUBLICATIONS

Fujitsu: "Considerations on Inter-UE Coordination for Mode 2 Enhancements", 3GPP TSG RAN WG1 #102-e, R1-2005546, 3rd Generation Partnership Project (3GPP), Mobile Competence Centre, 650, Route Des Lucioles, F-06921 Sophia-Antipolis Cedex, France, e-Meeting, Aug. 17, 2020-Aug. 28, 2020, Aug. 7, 2020, XP051914984, pp. 1-11.
(Continued)

*Primary Examiner* — Jenee Holland
(74) *Attorney, Agent, or Firm* — Patterson & Sheridan LLP

(57) ABSTRACT

Certain aspects of the present disclosure provide techniques for performing relay reselection and releasing unicast links between relay UEs and remote UEs separately from each other. An example method generally includes taking one or more actions to trigger a relay reselection procedure separately from releasing a unicast link between the UE and a first relay UE; establishing a unicast link between the UE and a second relay UE; and releasing the unicast link between the UE and the first relay UE.

57 Claims, 22 Drawing Sheets

(51) Int. Cl.
*H04W 76/30* (2018.01)
*H04W 88/04* (2009.01)

(56) References Cited

U.S. PATENT DOCUMENTS

| | | | | |
|---|---|---|---|---|
| 2020/0221532 | A1* | 7/2020 | Jung | H04W 48/20 |
| 2022/0330131 | A1* | 10/2022 | Martin | H04W 36/302 |
| 2023/0141478 | A1* | 5/2023 | Zhang | H04W 40/22<br>370/315 |
| 2023/0180313 | A1* | 6/2023 | Freda | H04W 76/14<br>370/310 |
| 2023/0362881 | A1* | 11/2023 | Wu | H04W 40/22 |
| 2023/0370902 | A1* | 11/2023 | Wang | H04W 28/0268 |

OTHER PUBLICATIONS

International Search Report and Written Opinion—PCT/CN2020/121471—ISA/EPO—Jun. 29, 2021.

* cited by examiner

1700

1800

1900

2100

RELAY RESELECTION AND LINK RELEASE MESSAGING IN RELAY RESELECTION PROCEDURES

CROSS-REFERENCE TO RELATED APPLICATIONS

This application is a national stage application under 35 U.S.C. 371 of PCT/CN2020/121471, filed Oct. 16, 2020, which is hereby assigned to the assignee hereof and hereby expressly incorporated by reference in its entirety as if fully set forth below and for all applicable purposes.

FIELD OF THE DISCLOSURE

Aspects of the present disclosure relate to wireless communications, and more particularly, to techniques for relay selection and re-selection using relay reselection procedures that are separate from link release messaging.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a remote user equipment (UE). The method generally includes taking or more actions to trigger a relay reselection procedure separately from releasing a unicast link between the UE and a first relay UE; establishing a unicast link between the UE and the second relay UE; and releasing the unicast link between the UE and the first relay UE.

Certain aspects provide a method for wireless communication by a relay user equipment (UE). The method generally includes performing a relay reselection procedure with a remote UE separately from releasing a unicast link between the UE and the remote UE; and releasing the unicast link between the UE and the relay UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
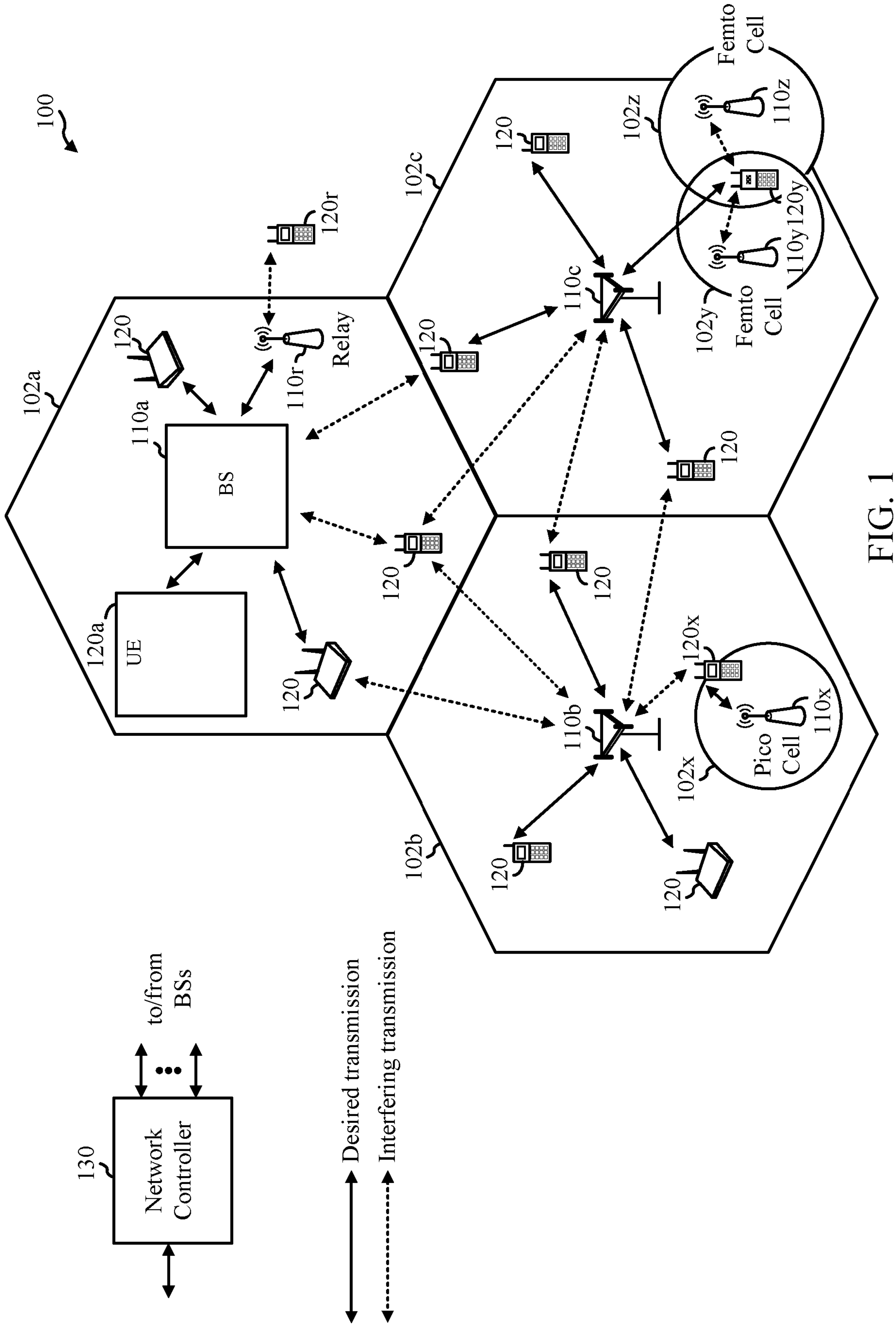
FIG. 1 is a block diagram conceptually illustrating an example telecommunications system, in accordance with certain aspects of the present disclosure.

Aspects of the present disclosure provide apparatus, methods, processing systems, and computer readable mediums for performing relay selection and reselection separately from releasing communications links between a relay UE and a remote UE in sidelink layer 2 (L2) and/or layer 3 (L3) relay systems.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120*a* and/or BS 110*a* of FIG. 1 may be configured to perform operations 1100, 1200, and 1300 described below with reference to FIGS. 15, 16, and 17 to process paged communications in sidelink L2 relay scenarios.

As illustrated in FIG. 1, the wireless communication network 100 may include a number of base stations (BSs) 110*a-z* (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay UEs (e.g., relay UE 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
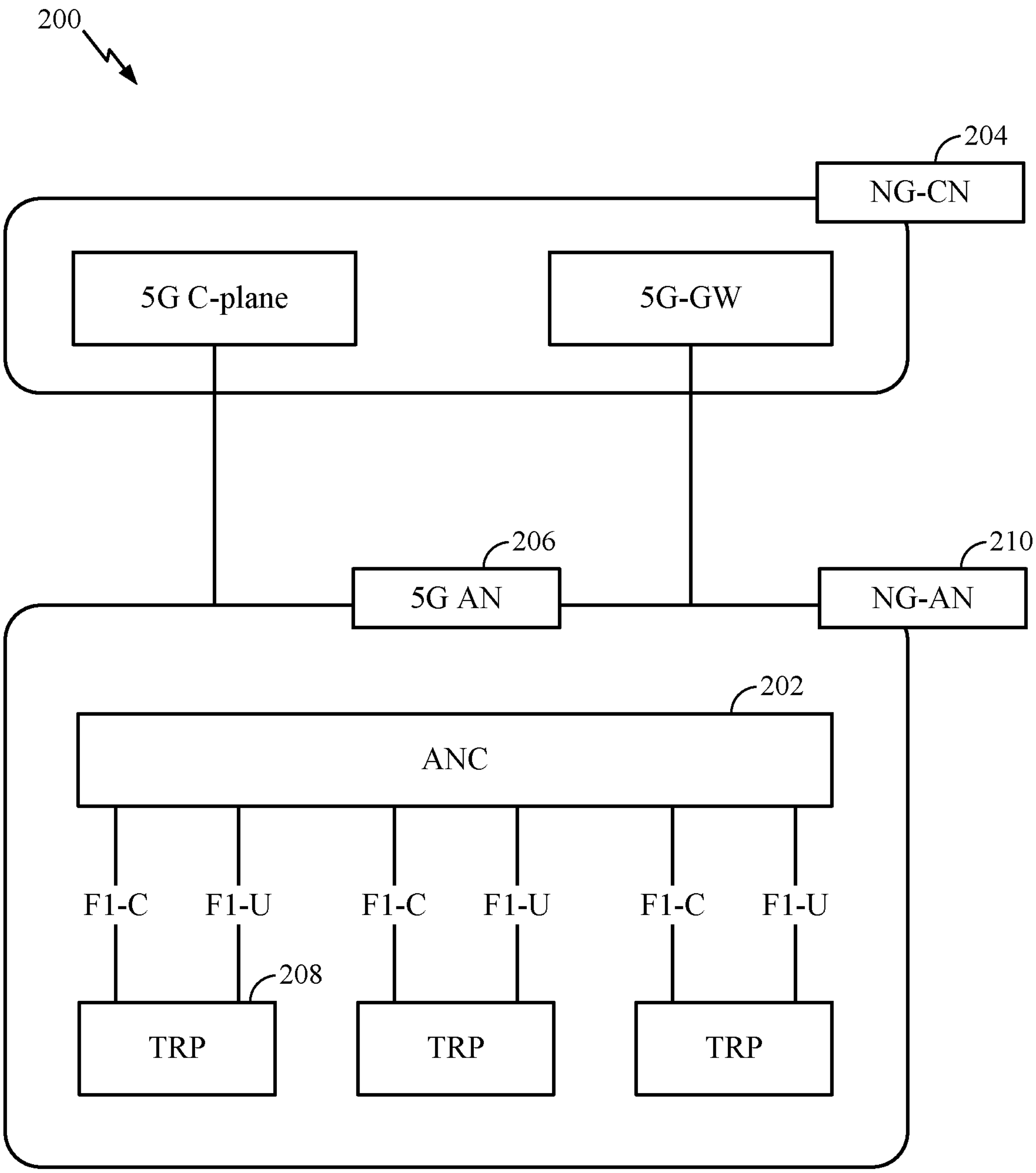
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
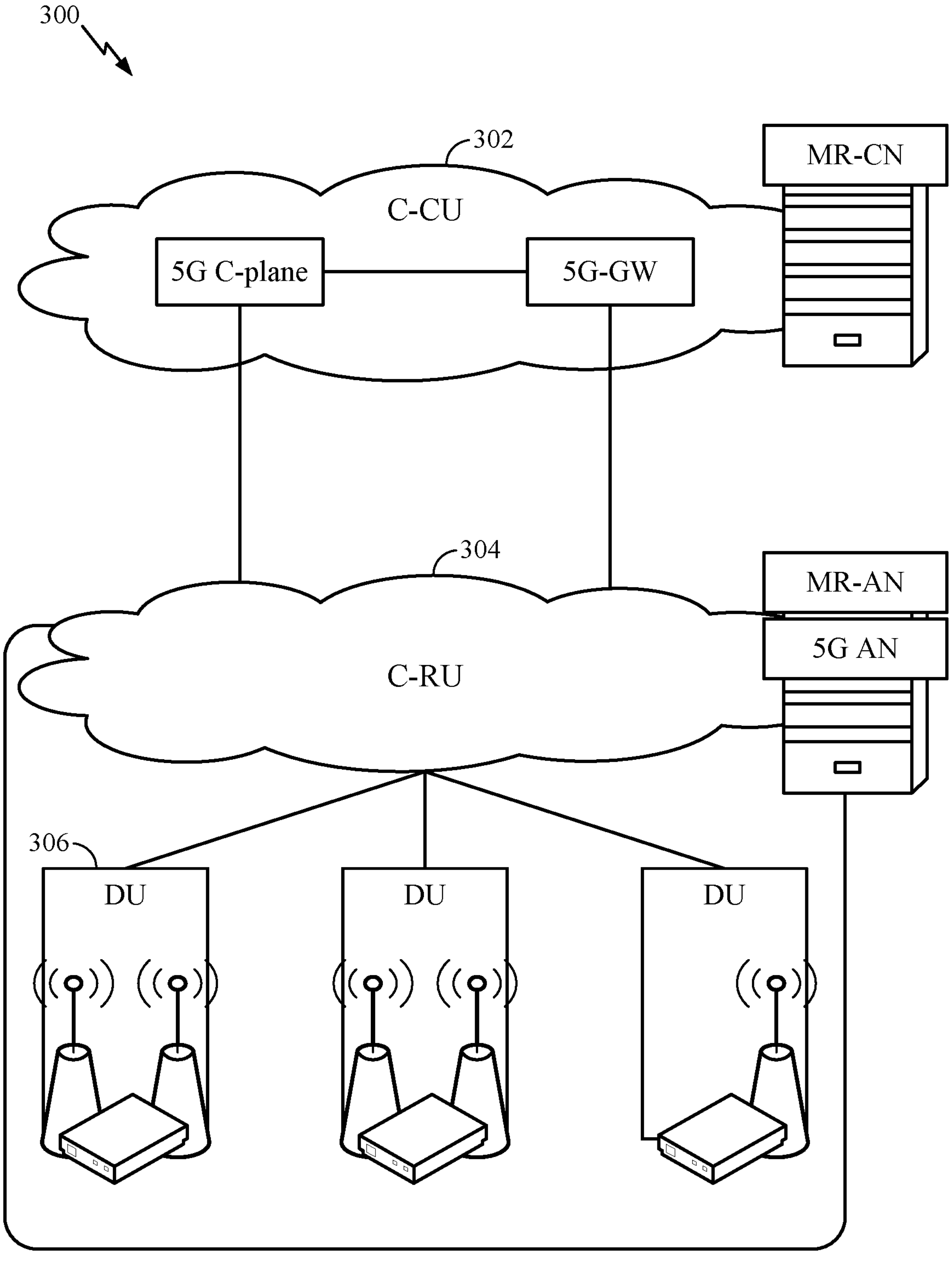
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
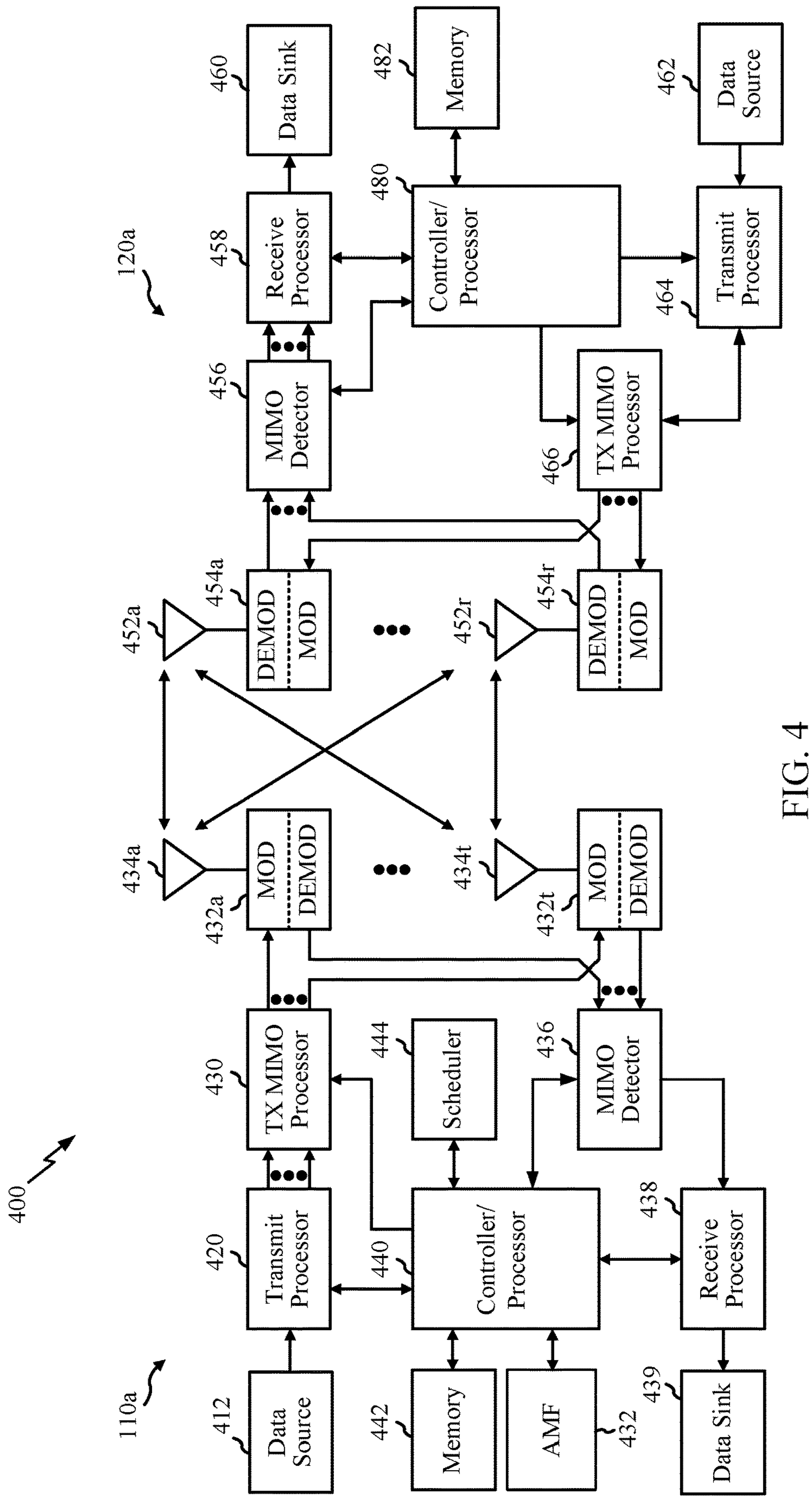
FIG. 4 is a block diagram conceptually illustrating a design of an example base station (BS) and user equipment (UE), in accordance with certain aspects of the present disclosure.

FIG. 4 illustrates example components of BS 110*a* and UE 120*a* (as depicted in FIG. 1), which may be used to implement aspects of the present disclosure. For example, antennas 452, processors 466, 458, 464, and/or controller/processor 480 of the UE 120*a* and/or antennas 434, processors 420, 430, 438, and/or controller/processor 440 of the BS 110*a* may be used to perform the various techniques and methods described herein with reference to FIGS. 15, 16, and 17.

At the BS 110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120*a*, the antennas 452*a* through 452*r* may receive the downlink signals from the base station 110*a* and may provide received signals to the demodulators (DEMODs) in transceivers 454*a* through 454*r*, respectively. Each demodulator 454 may condition (e.g., filter, amplify, downconvert, and digitize) a respective received signal to obtainput samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein with reference to FIGS. 15, 16, and 17.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to NW Relay

Figure 5:
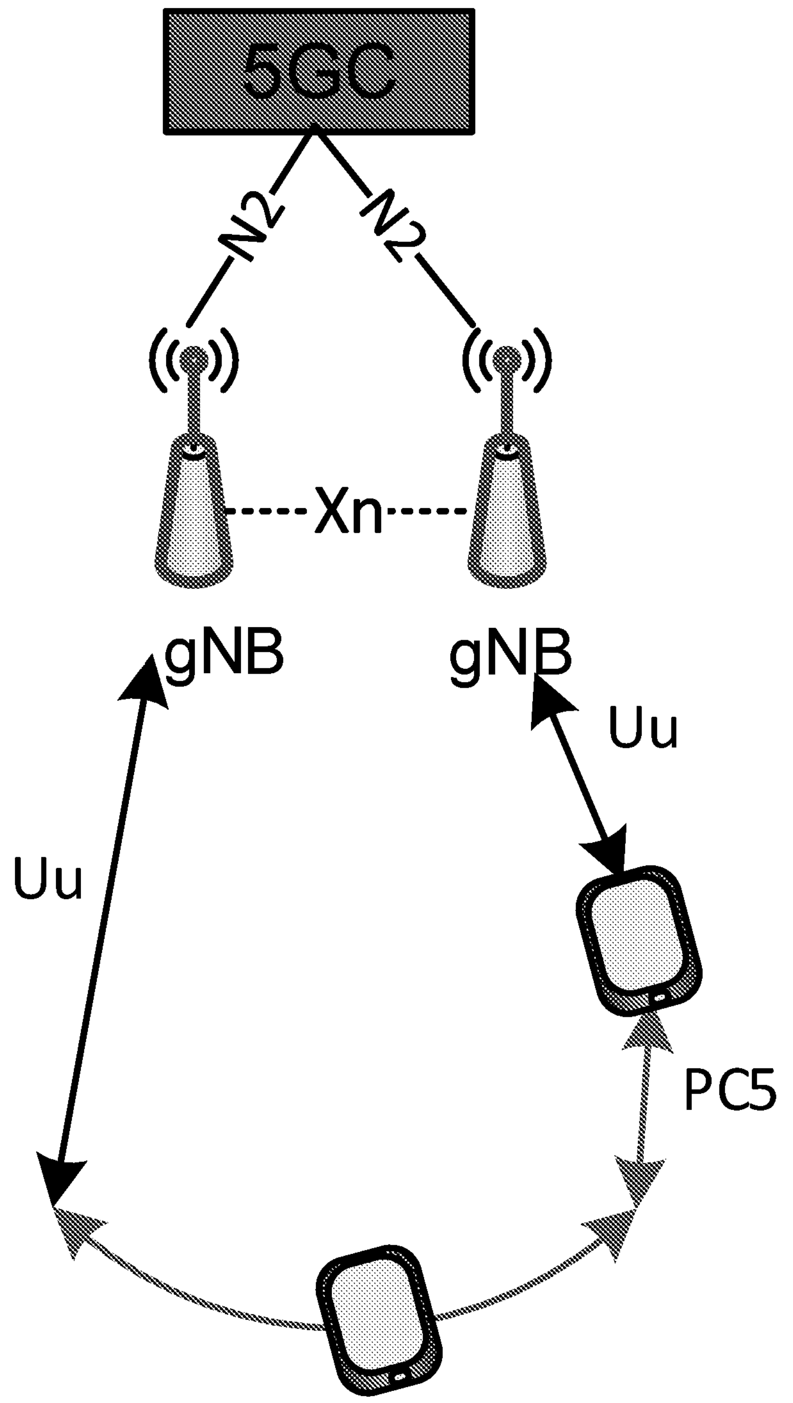
FIG. 5 is a high level path diagram illustrating example connection paths of a remote user equipment (UE), in accordance with certain aspects of the present disclosure.

Aspects of the present disclosure involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
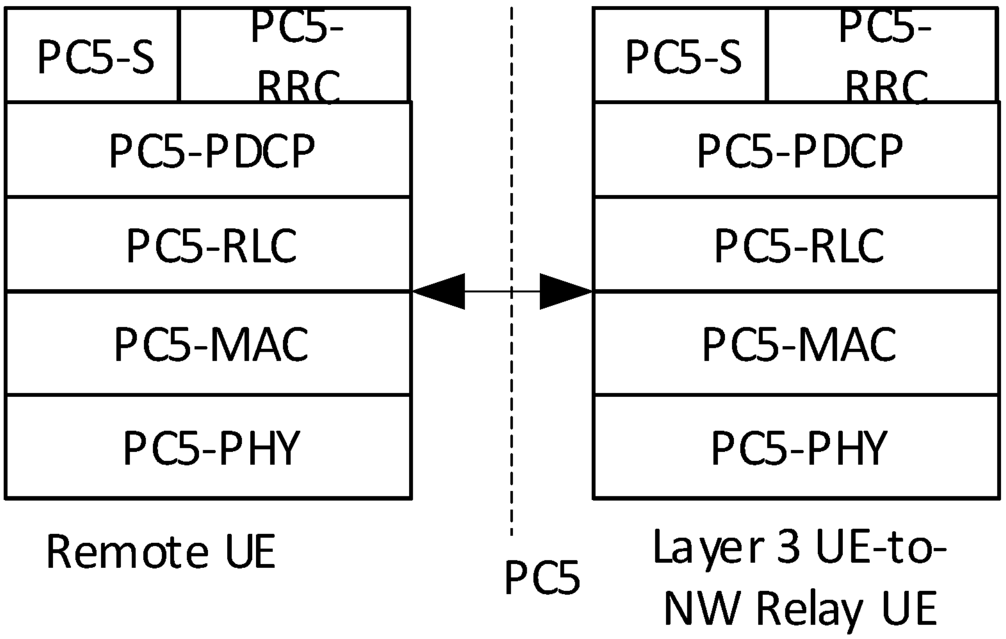
FIG. 6 is an example block diagram illustrating a control plane protocol stack on L3, when there is no direct connection path between the remote UE and the network node, in accordance with certain aspects of the present disclosure.
Figure 7:
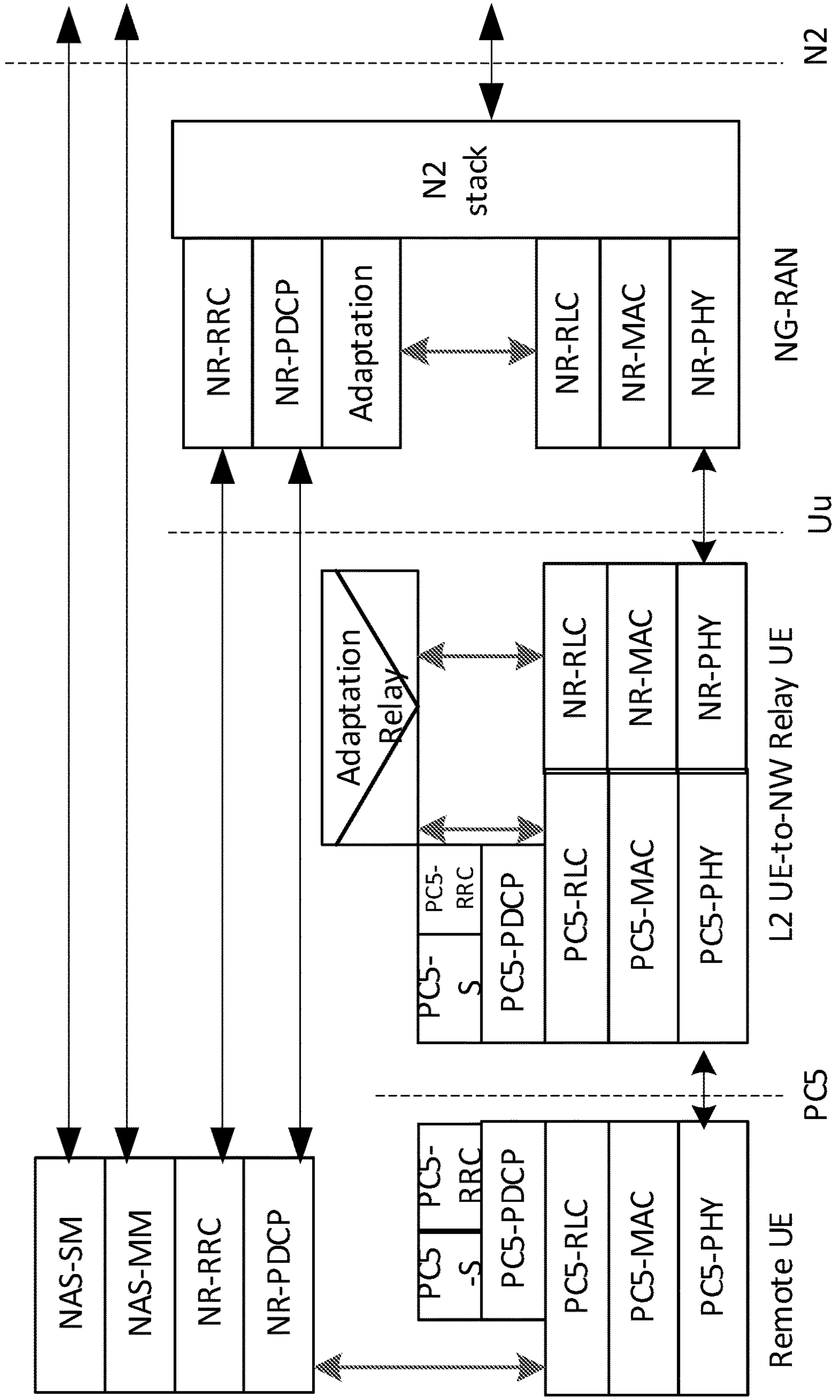
FIG. 7 is an example block diagram illustrating a control plane protocol stack on L2, when there is direct connection path between the remote UE and the network node, in accordance with certain aspects of the present disclosure.

As shown in FIGS. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Certain systems, such as NR, may support standalone (SA) capability for sidelink-based UE-to-network and UE-to-UE relay communications, for example, utilizing layer-3 (L3) and layer-2 (L2) relays, as noted above.

Figure 8:
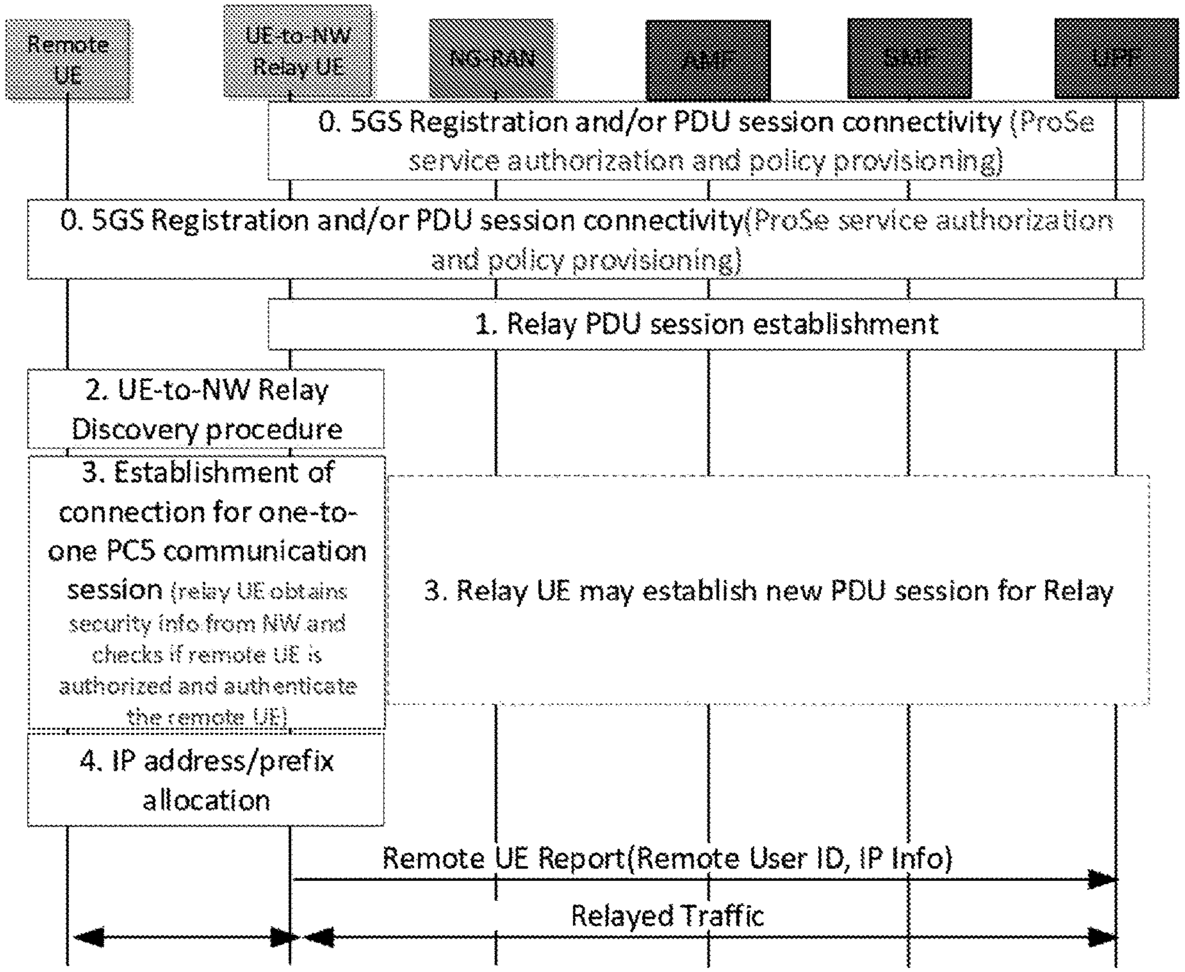
FIG. 8 illustrates example layer 3 (L3) relay procedures, in accordance with certain aspects of the present disclosure.

Particular relay procedures may depend on whether a relay is a L3 or L2 relay. FIG. 8 illustrates an example dedicated PDU session for an L3 relay. In the illustrated scenario, a remote UE establishes PC5-S unicast link setup and obtains an IP address. The PC5 unicast link AS configuration is managed using PC5-RRC. The relay UE and remote UE coordinate on the AS configuration. The relay UE may consider information from RAN to configure PC5 link. Authentication/authorization of the remote UE access to relaying may be done during PC5 link establishment. In the illustrated example, the relay UE performs L3 relaying.

Figure 9:
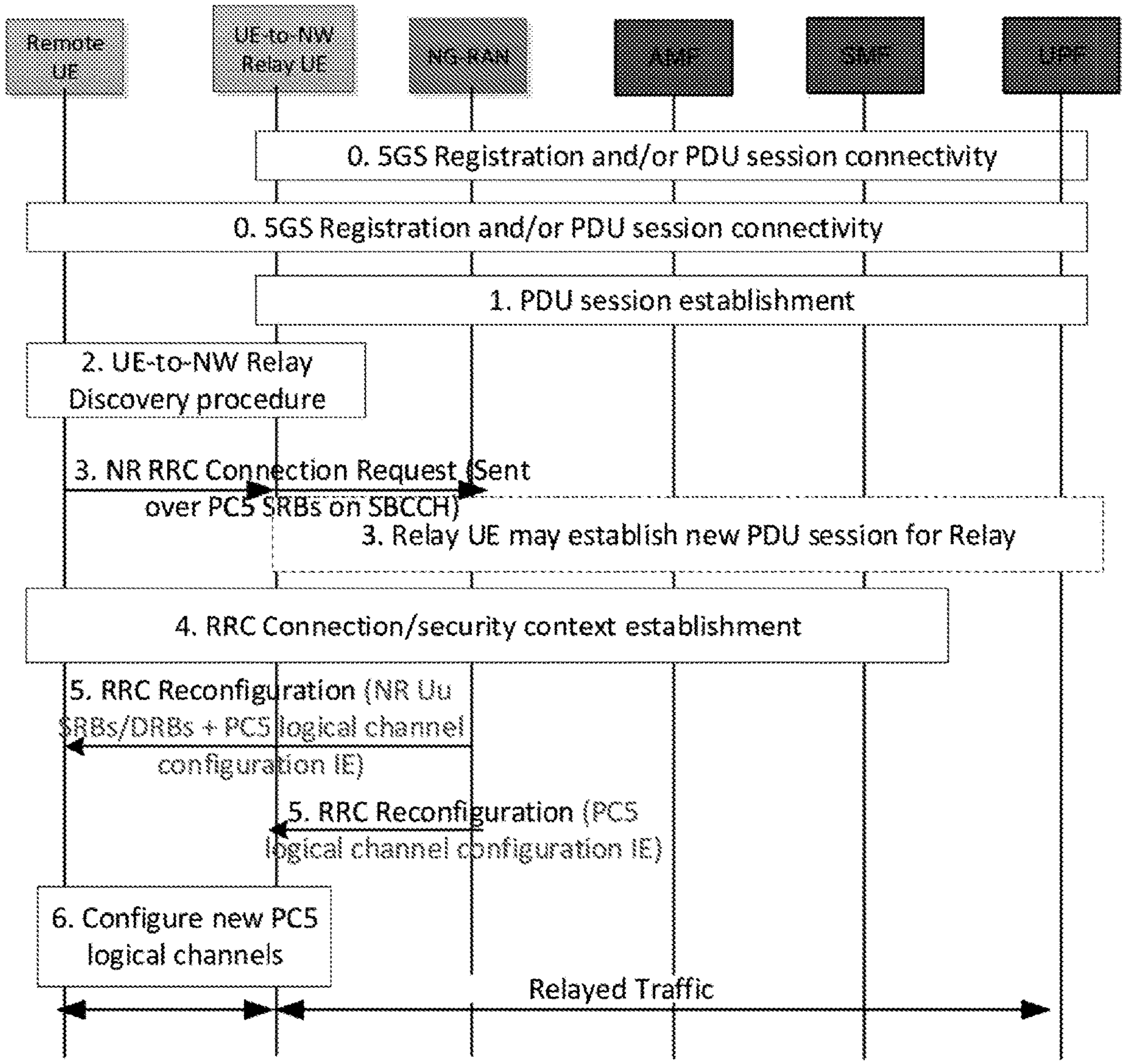
FIG. 9 illustrates example layer 2 (L2) relay procedures, in accordance with certain aspects of the present disclosure.

FIG. 9 illustrates an example dedicated PDU session for an L2 relay. In the illustrated scenario, there is no PC5 unicast link setup prior to relaying. The remote UE sends the NR RRC messages on PC5 signaling radio bearers (SRBs) over a sidelink broadcast control channel (SBCCH). The RAN can indicate the PC5 AS configuration to remote UE and relay UE independently via NR RRC messages. Changes may be made to NR V2X PC5 stack operation to support radio bearer handling in NR RRC/PDCP but support corresponding logical channels in PC5 link. In L2 relaying, PC5 RLC may need to support interacting with NR PDCP directly.

There are various issues to be addressed with sidelink relay DRX scenarios. One issue relates to support of a remote UE sidelink DRX for relay discovery. One assumption for relay discover in some cases is that the Relay UE is in CONNECTED mode only, rather than IDLE/INACTIVE. A remote UE, may be in a CONNECTED, IDLE/INACTIVE or out of coverage (OOC) modes.

Figure 10A:
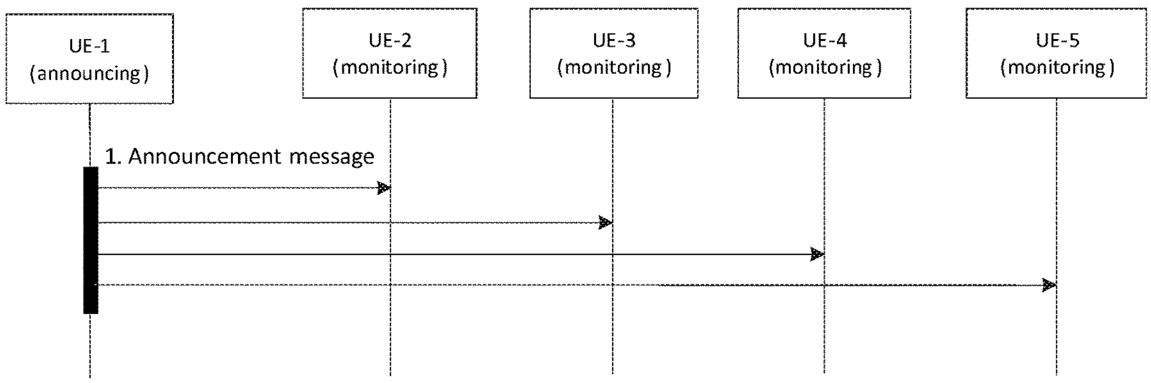
FIGS. 10A and 10B illustrate example relay discovery procedures.
Figure 10B:
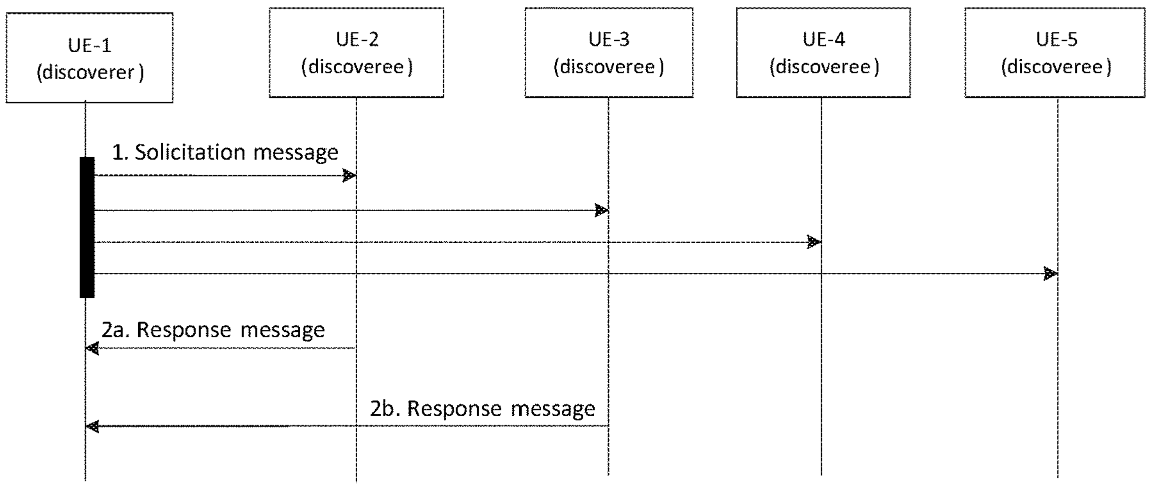

Discovery for both relay selection and reselection may be supported. Different type of discovery models may be supported. For example, a first model (referred to as Model A discovery) is shown in FIG. 10A. In this case, a UE sends discovery messages (an announcement) while other UEs monitor. According to a second model (referred to as Model B discovery) shown in FIG. 10B, a UE (discoverer) sends a solicitation message and waits for responses from monitoring UEs (discoverees). Such discovery messages may be sent on a PC5 communication channel (e.g., and not on separate discovery channel). Discovery messages may be carried within the same layer-2 frames as those used for other direct communication including, for example, the Destination Layer-2 ID that can be set to a unicast, groupcast or broadcast identifier, the Source Layer-2 ID that is always set to a unicast identifier of the transmitter, and the frame type indicates that it is a ProSe Direct Discovery message.

As noted above, for relay selection, the remote UE has not connected to any relay node (i.e. PC5 unicast link is not established between remote UE and relay node). In this case, it may be desirable to design DRX modes to reduce remote UE power consumption on monitoring relay discovery messages for relay selection.

As noted above, for relay reselection, the remote UE has connected to at least one relay node (e.g., with a PC5 unicast established between the emote UE and relay node). For relay reselection, it may be desirable to design a DRX configuration that helps reduce remote UE power consumption while monitoring for relay discovery messages for relay reselection and PC5 data transmission.

Figure 11:
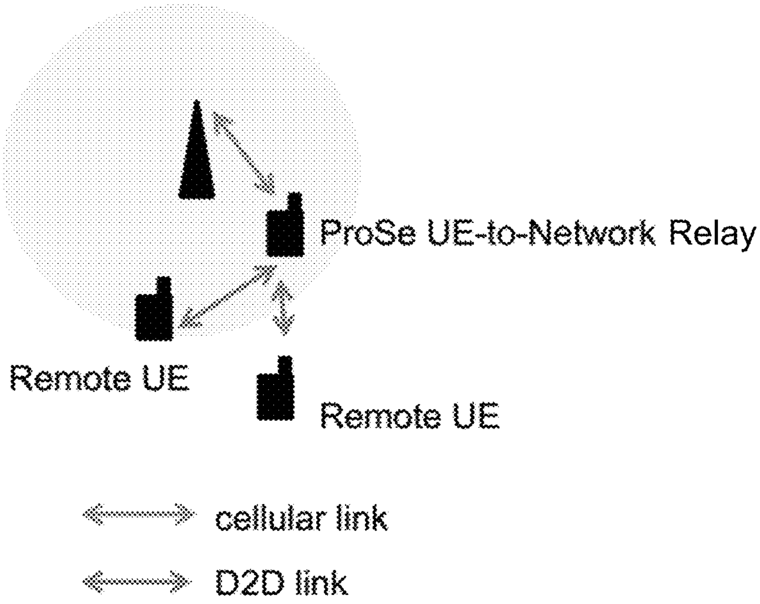
FIG. 11 illustrates an example communications environment in which a relay UE serves one or more remote UEs.

FIG. 11 illustrates an example environment in which remote UEs are served by a network entity through a UE-to-network relay (e.g., a relay UE). To communicate through a relay UE, a remote UE, which has not connected to a relay node, may discover relay nodes and select one or more of the relay nodes as the remote UE's relay. The remote UE may, for example, discover all relay nodes with a sidelink discovery reference signal received power (SD-RSRP) above a first threshold value (e.g., more than minHyst above q-Rx-LevMin). The remote UE may also reselect a relay when the remote UE is already connected with a relay node. To do so, the remote UE can determine that the sidelink RSRP (SL-RSRP) is below a second threshold value (e.g., more than minHyst below q-Rx-LevMin), and based on the determination, discover relay nodes having an SD-RSRP above the first threshold value.

Example Relay Reselection and Link Release Messaging in Relay Reselection Procedures Aspects of the present disclosure provide apparatus, methods, processing systems, and computer readable mediums for performing relay selection and reselection separately from releasing communications links between a relay UE and a remote UE in sidelink layer 2 (L2) and/or layer 3 (L3) relay systems. As will be described, the techniques may enable a remote UE to quickly select and reselect relay UEs in response to changing states of network connections between the remote UE and the relay UE(s) and may allow for the release of unicast links without triggering relay reselection procedures.

Figure 12A:
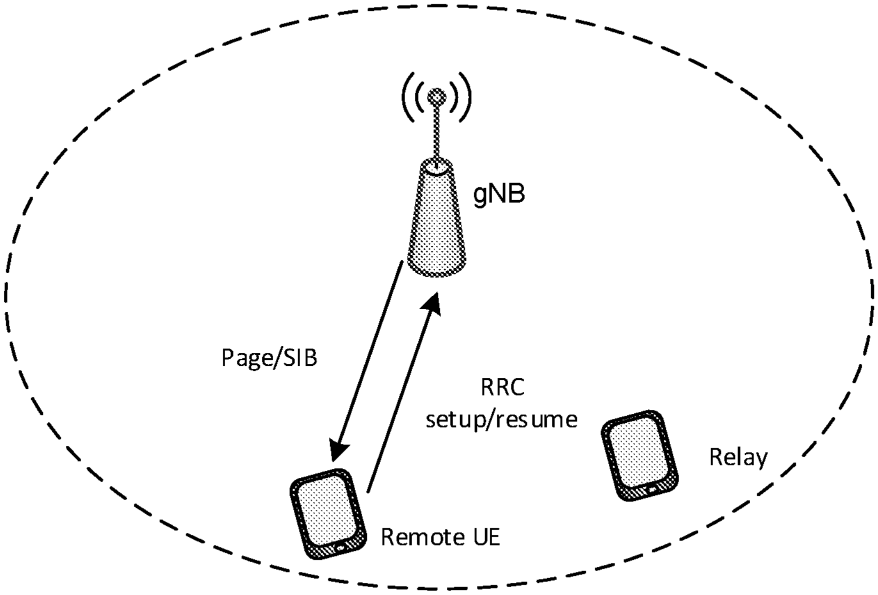
FIGS. 12A and 12B illustrate example scenarios in which a remote UE receives paging and system information blocks based on whether the remote UE is in or out of coverage of a network entity.
Figure 12B:
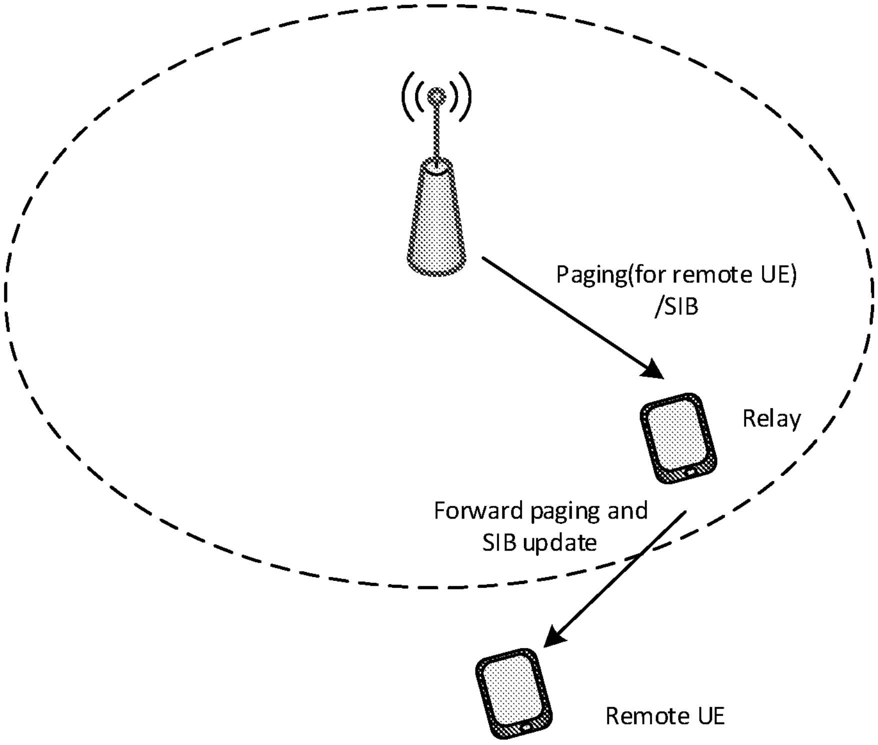

FIGS. 12A and 12B illustrate example scenarios in which a UE communicates with a network entity (e.g., a gNB). In both scenarios illustrated in FIGS. 12A and 12B, the relay UE is in coverage, and in one of an RRC Idle, Inactive, or Connected state. In the scenario illustrated in FIG. 12A, the remote UE is in coverage of the network entity. Because the remote UE is in coverage, the remote UE can receive paging and system information blocks (SIBs) directly from the network entity via the Uu link. However, in the scenario illustrated in FIG. 12B, the remote UE may be out of coverage of the network entity. Because the remote UE is out of coverage, and the relay UE is in coverage, the remote UE may connect with the relay UE and receive paging and SIBs from the network entity via the relay UE.

Figure 13:
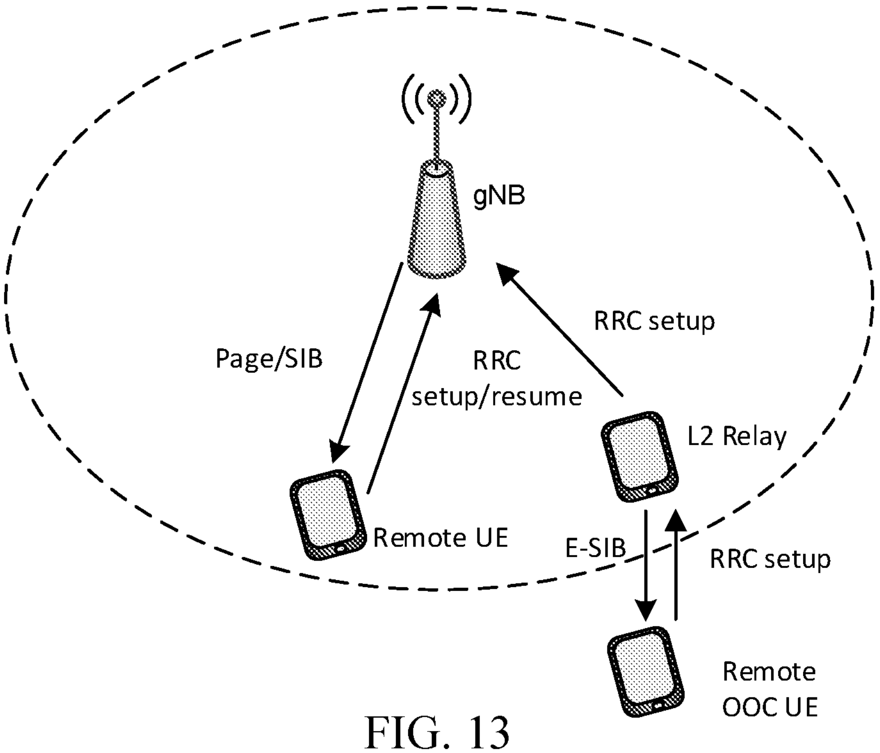
FIG. 13 illustrates example connection paths of a remote UE and paging prior to connecting with a relay.

FIG. 13 illustrates an example of paging by a remote UE prior to connecting with a relay UE. Before the remote UE connects with the relay UE, the UE may follow UE Idle or Inactive behavior as would be used were a remote UE connecting with a network entity. For example, the UE may perform idle mode measurements and cell (re)selection. Upon reception of Uu paging from a network entity, the UE can trigger unified access control (UAC) and radio resource configuration (RRC) setup or resumption, and can monitor the Uu connection for SIB updates. Remote UEs within coverage of a network entity may receive paging from the network entity; however, remote UEs outside of coverage of the network entity that are not connected with an in-coverage relay may not be able to receive paging and SIBs from the network entity.

Figure 14:
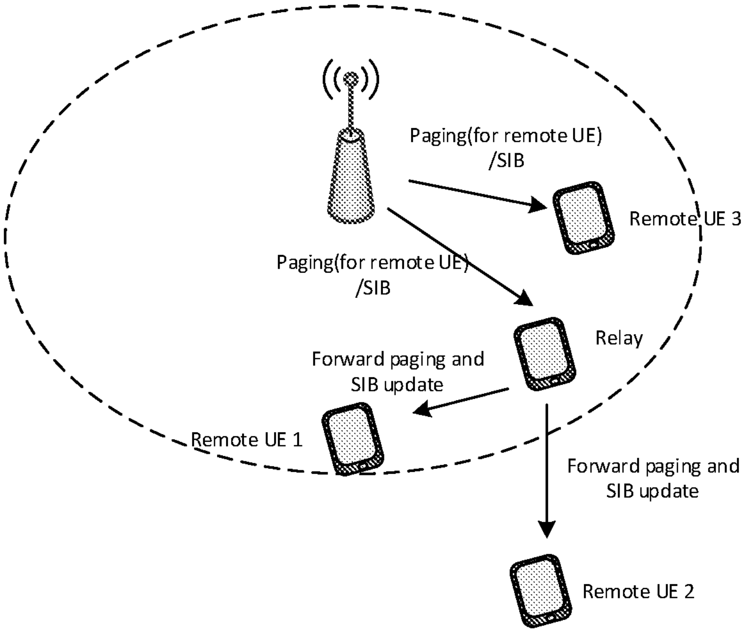
FIG. 14 illustrates example connection paths between remote UEs and relays after remote UEs connect with a relay.

FIG. 14 illustrates an example of paging by a remote UE after connecting with a relay (e.g., after a PC5 RRC connection is established). The remote UE can be configured by a gNB in one of a plurality of paging modes. In direct paging, a remote UE may monitor Uu paging and SIB updates. Direct paging may be a default mode that a remote UE applies if no signaling is received that indicates the paging mode to be used by the UE. Forward paging may allow the remote UE to forego monitoring for Uu paging or SIB updates; the relay UE, instead, monitors the remote UE's paging and forwards the remote UE's paging to the remote UE. Adaptive paging may allow for switching between direct and forward paging based on a request by the remote UE. Finally, a remote UE can be configured in a no-paging mode in which neither the remote UE nor the relay UE monitors Uu paging and/or SIB updates for the remote UE. Generally, the remote paging mode may be configured on a per-remote-UE basis, as illustrated in FIG. 14. For example, remote UE 3 may directly monitor Uu paging, while remote UEs 1 and 2, which are connected with the relay UE, may rely on paging forwarding.

In LTE Prose, L2 release messages may be used to release a sidelink layer 2 link between a remote UE and a relay node (e.g., a UE-to-Network Relay, relay UE, etc.). Generally, the L2 release messages may include a disconnect request message transmitted from a first UE to a second UE, and a disconnect response message transmitted from the second UE to the first UE in response to receipt of the disconnect request message. Transmission of the L2 release message may be initiated by either the remote UE or the relay node as a result of various causes. For example, a remote UE or relay node may initiate transmission of an L2 release message in response to a temporary loss of connectivity to the network, an amount of battery life remaining at the relay node falling below a threshold amount of remaining battery life, or other reasons that may cause a remote UE or relay node to determine that the connection between the remote UE and relay node should be terminated. In LTE Prose, the L2 release messaging may be transmitted via broadcast signaling. In NR Prose, L2 release messaging may be used to release a unicast link between a relay UE and a remote UE. The V2X layer of each UE may inform that autonomous system (AS) layer that the unicast link has been released, which allows the AS layer to delete the context related to the released unicast link.

In sidelink systems, relay reselection need not be triggered by the release of a unicast sidelink connection (i.e., a PC5 RRC link) between remote and relay UEs. An L2 release procedure may be triggered when the unicast sidelink is no longer needed. For example, the L2 release procedure may be triggered, for example, if there is no pending traffic for the UE or if a radio bearer needs reconfiguration (e.g., due to QoS requirements). In these cases, the sidelink connection may be released without needing to trigger relay reselection, as a triggering event that may be used to trigger relay reselection may not necessarily be encountered when a unicast sidelink connection is to be released. Further, it may be implied that a unicast sidelink connection is to be released as a precondition to triggering relay reselection, which may interrupt communications between the relay and remote UEs. However, interruptions may be reduced by releasing a connection between a remote UE and a first relay UE after a relay reselection procedure is completed such that the remote UE is configured to communicate with a second relay UE before it releases the connection between the remote UE and the first relay UE.

Figure 15:
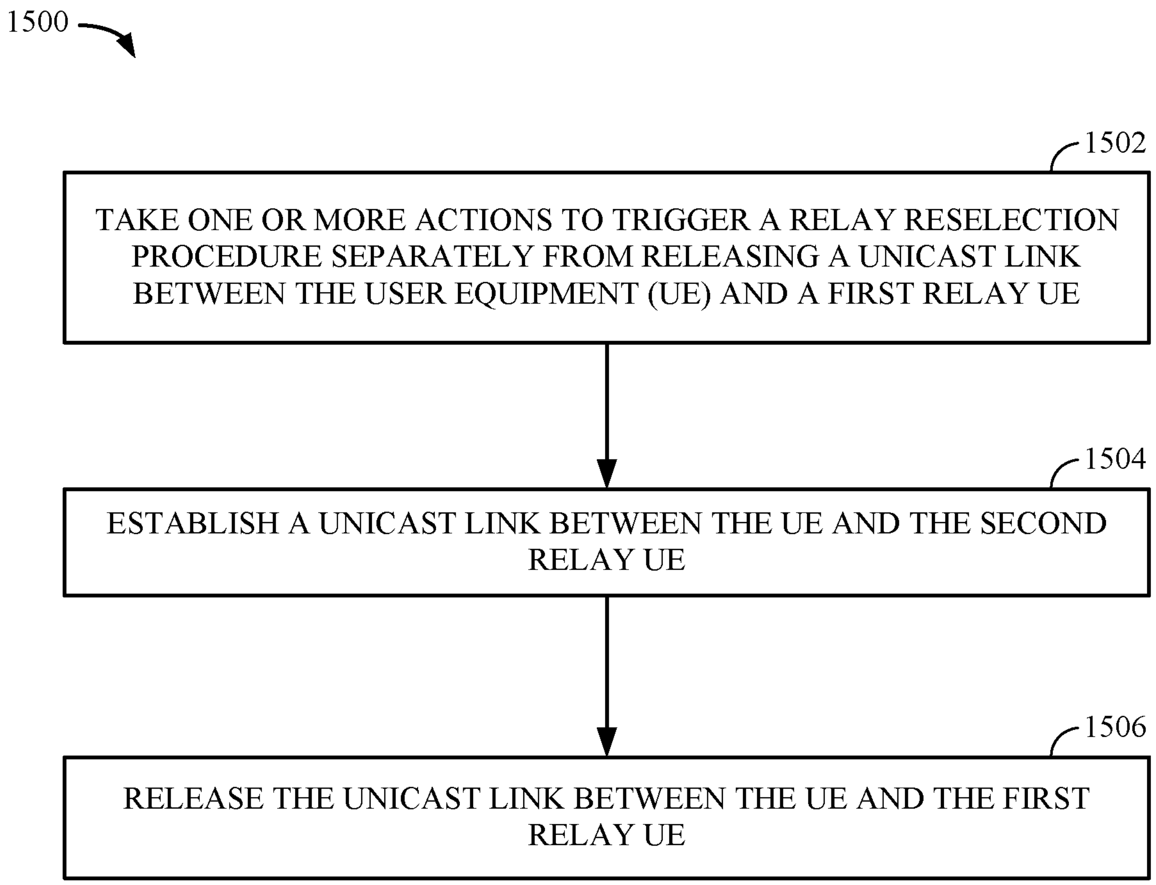
FIG. 15 is a flow diagram illustrating example operations that may be performed by a remote UE, in accordance with certain aspects of the present disclosure.
Figure 16:
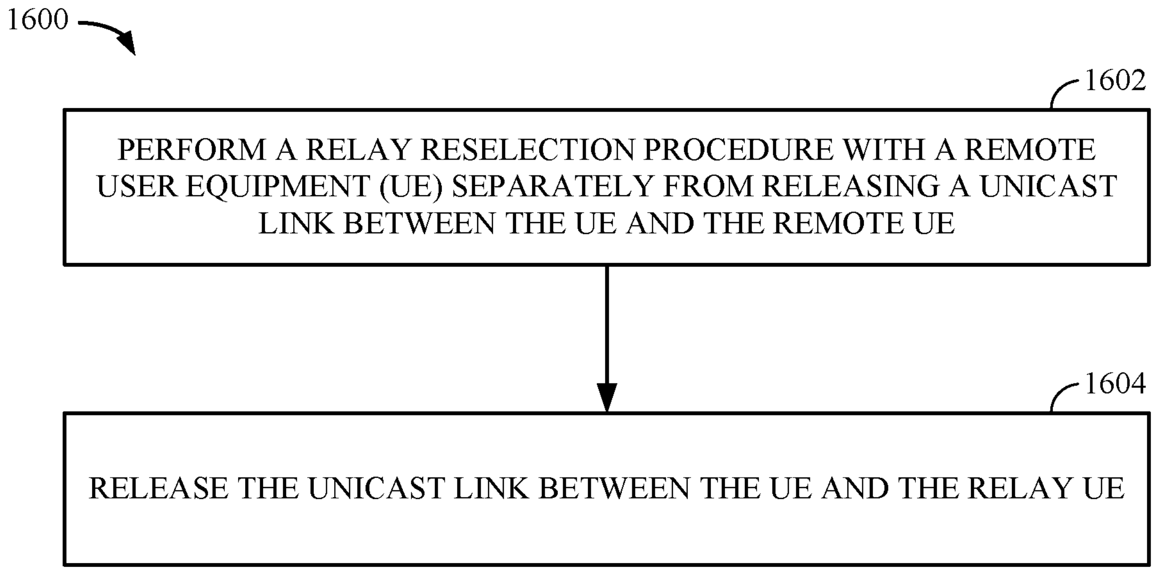
FIG. 16 is a flow diagram illustrating example operations that may be performed by a relay UE, in accordance with certain aspects of the present disclosure.

Aspects of the present disclosure may allow for remote UEs and relay UEs to perform relay selection and reselection separately from releasing communications links between a relay UE and a remote UE. FIGS. 15 and 16 illustrate example operations from the perspective of a remote UE and relay UE, respectively, for performing relay selection and reselection separately from releasing communications links between a relay UE and a remote UE.

FIG. 15 illustrates example operations 1500 that may be performed by a remote UE to perform relay selection and reselection separately from releasing communications links between a relay UE and a remote UE in sidelink L2 or L3 relay systems based on discovery information. As illustrated, operations 1500 begin at block 1502, where the remote UE takes one or more actions to trigger a relay reselection procedure separately from releasing a unicast link between the remote UE and a first relay UE.

At block 1504, the remote UE establishes a unicast link between the remote UE and a second relay UE.

At block 1506, the remote UE releases the unicast link between the remote UE and the first relay UE.

FIG. 16 illustrates example operations 1600 that may be performed by a relay UE for performing relay selection and reselection separately from releasing communications links between a relay UE and a remote UE in sidelink layer 2 (L2) and/or layer 3 (L3) relay systems. As illustrated, operations 1600 may begin at block 1602, where the relay UE performs a relay reselection procedure with a remote UE separately from releasing a unicast link between the relay UE and the remote UE.

At block 1604, the relay UE releases the unicast link between the relay UE and the remote UE.

In some aspects, separate messaging may be used to trigger relay reselection and release of a unicast link between a remote UE and a first relay UE. The messaging used to trigger relay reselection may include a relay reselection request message and a relay reselection response message. In one aspect, the remote UE may transmit the relay reselection request message to the first relay UE, and the first relay UE may transmit the relay reselection response message to the remote UE. In another aspect, the first relay UE may transmit the relay reselection request message to the remote UE, and the remote UE may respond by transmitting the relay reselection response message to the first relay UE. Generally, transmission of a relay reselection request message may be triggered by higher layers, for example, due to radio link failure, link quality degradation below a threshold link quality metric (e.g., a reference signal received power (RSRP) of a unicast link falling below a threshold RSRP, etc.), remaining battery life at a remote UE or first relay UE falling below a threshold remaining battery life level, or the like.

A UE that receives a relay reselection request message may not be required to accept the relay reselection request. Generally, the UE that receives the relay reselection request message may include an indication of whether the relay reselection request was accepted or refused in the relay reselection response message. If the relay reselection response message includes an indication that the relay reselection request was accepted, the UE that receives the relay reselection response message may initiate a relay reselection procedure. As discussed above, the relay reselection messaging may be separately from messaging used to release a unicast link between a remote UE and a relay UE. The remote UE may transmit the release messaging at a time of its choosing (e.g., upon completion of a relay reselection procedure, upon receipt of specific messaging such as a relay selection response, or the like).

Figure 17:
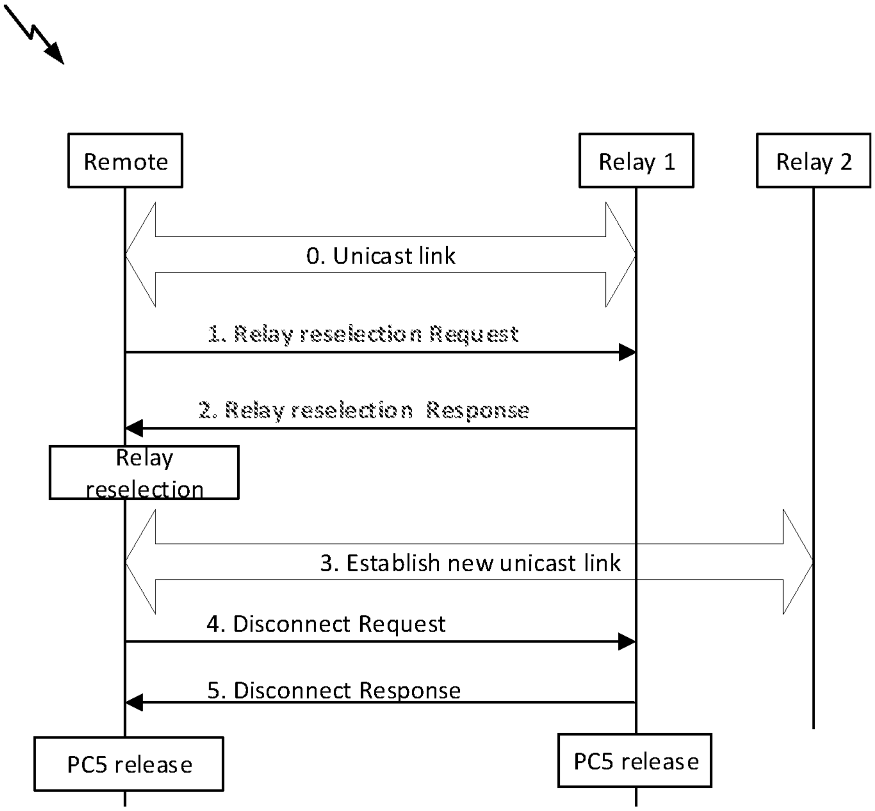
FIG. 17 illustrates example messages that may be exchanged in remote UE-triggered relay reselection and connection release, in accordance with certain aspects of the present disclosure.

FIG. 17 illustrates example messages that may be exchanged in a remote UE-triggered relay reselection and connection release operations 1700, in accordance with certain aspects of the present disclosure.

As illustrated, operations 1700 begins with a unicast link having been established between a remote UE and a first relay UE (i.e., relay 1). To trigger a relay reselection procedure, the remote UE may transmit a relay reselection request message to the first relay UE, and in response, the first relay UE may transmit a relay reselection response message to the remote UE. The remote UE may select a second relay UE (i.e., relay 2) during the relay reselection procedure and establish a new unicast link between the remote UE and the second relay UE. Subsequently, the remote UE and the first relay UE may exchange disconnect request and disconnect response messages to release the unicast link between the remote UE and the first relay UE.

Figure 18:
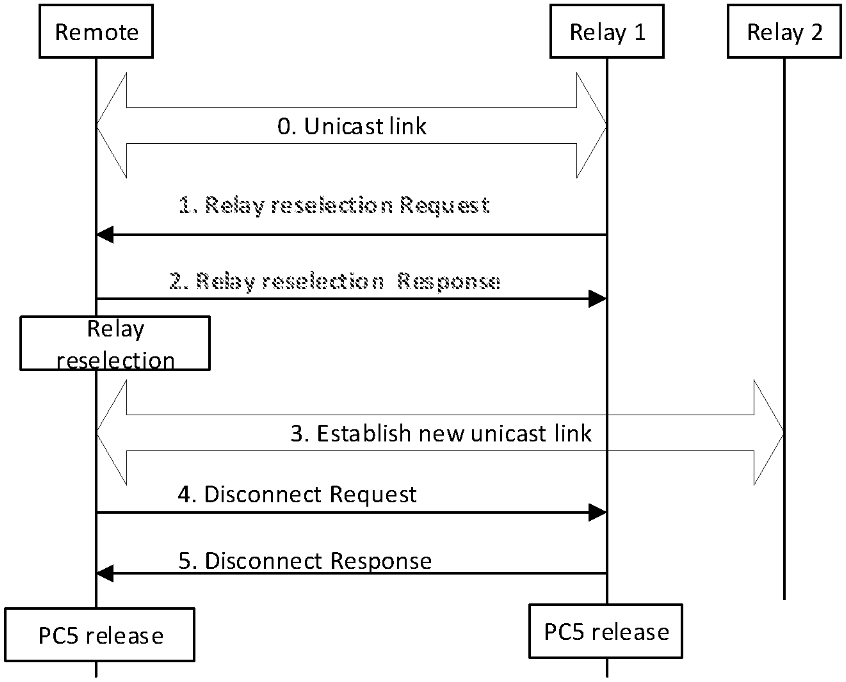
FIG. 18 illustrates example messages that may be exchanged in relay UE-triggered relay reselection and connection release, in accordance with certain aspects of the present disclosure.

FIG. 18 illustrates example messages that may be exchanged in relay UE-triggered relay reselection and connection release operations 1800, in accordance with certain aspects of the present disclosure.

As illustrated, operations 1800, like operations 1700 illustrated in FIG. 17, may begin with a unicast link having been established between a remote UE and a first relay UE. To trigger a relay reselection procedure, the first relay UE may transmit a relay reselection request message to the remote UE, and in response, the remote UE may transmit a relay reselection response message to the first relay UE. Assuming that the remote UE accepted the relay reselection request included in the relay reselection request message transmitted by the first relay UE, the remote UE may select a second relay UE (i.e., relay 2) during the relay reselection procedure and establish a new unicast link between the remote UE and the second relay UE. Subsequently, the remote UE and the first relay UE may exchange disconnect request and disconnect response messages to release the unicast link between the remote UE and the first relay UE.

Figure 19:
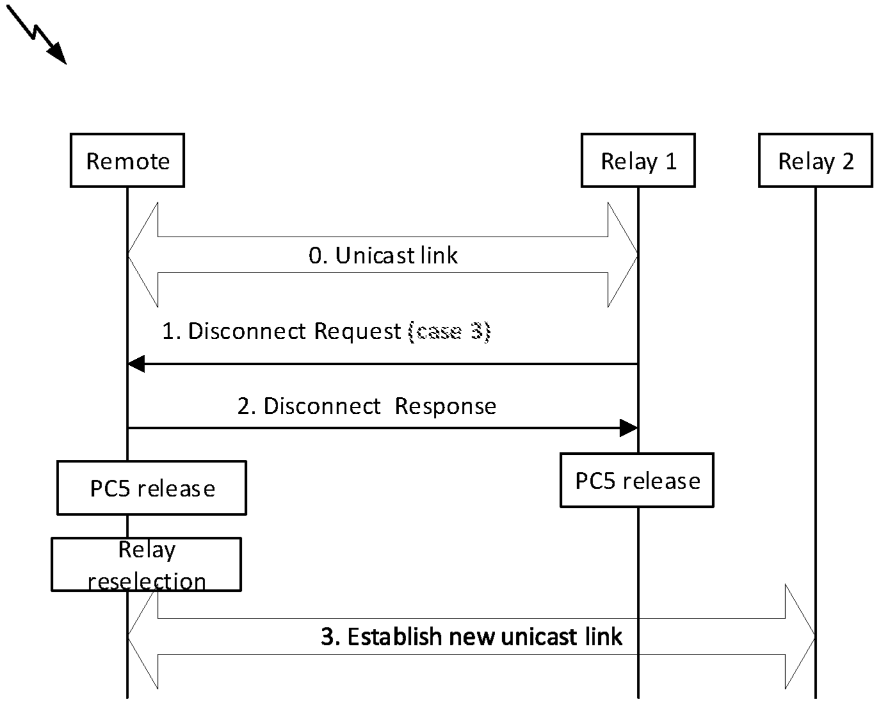
FIG. 19 illustrates example messages that may be exchanged in relay UE-triggered relay reselection and connection release in which a sidelink connection is released prior to relay reselection, in accordance with certain aspects of the present disclosure.

FIG. 19 illustrates example messages that may be exchanged in relay UE-triggered relay reselection and connection release operations 1900 in which a sidelink connection is released prior to relay reselection, in accordance with certain aspects of the present disclosure.

As illustrated, operations 1900 may begin with a unicast link having been established between a remote UE and a first relay UE. To trigger the release of a unicast link between the remote UE and a first relay UE, the first relay UE may transmit a disconnect request message (e.g., an L2 connection release message) to the remote UE, and the remote UE may respond with a disconnect response message. Generally, a field in the disconnect request message may indicate operations that are to be performed with respect to relay reselection and connection release. A first value of the field in the disconnect request message may indicate that only relay reselection is to be performed in response to receiving the disconnect request message. A second value of the field in the disconnect request message may indicate that the unicast link between the remote UE and the first relay UE is to be released, but relay reselection need not be triggered in response to receiving the disconnect request message. Finally, a third value of the field in the disconnect request message may indicate that the unicast link between the remote UE and the first relay UE is to be released, and then relay reselection is to be triggered.

Subsequent to receiving the disconnect request message, the remote UE and first relay UE may release the unicast link between the remote UE and the first relay UE and trigger relay reselection, according to the value of the field in the disconnect request message. Generally, where the third value indicating that the unicast link between the remote UE and the first relay UE is to be released prior to performing relay reselection, the remote UE may trigger relay reselection after the process of releasing the unicast link between the remote UE and the first relay UE is completed. Subsequently, a new unicast link may be established with the relay UE selected in the relay reselection process (e.g., as illustrated, with the second relay UE illustrated in FIG. 19).

While FIG. 19 illustrates a relay UE-triggered relay reselection and connection release operation, it should be recognized that the remote UE may transmit the disconnect request message using the techniques described above. That is, the remote UE may transmit the disconnect request message including the field that indicates operations that are to be performed with respect to relay reselection and connection release, and the first relay UE may respond with the disconnect response message. Transmission of the disconnect request message by either the remote UE or the relay UE may be triggered by higher layers, as discussed above.

Figure 20:
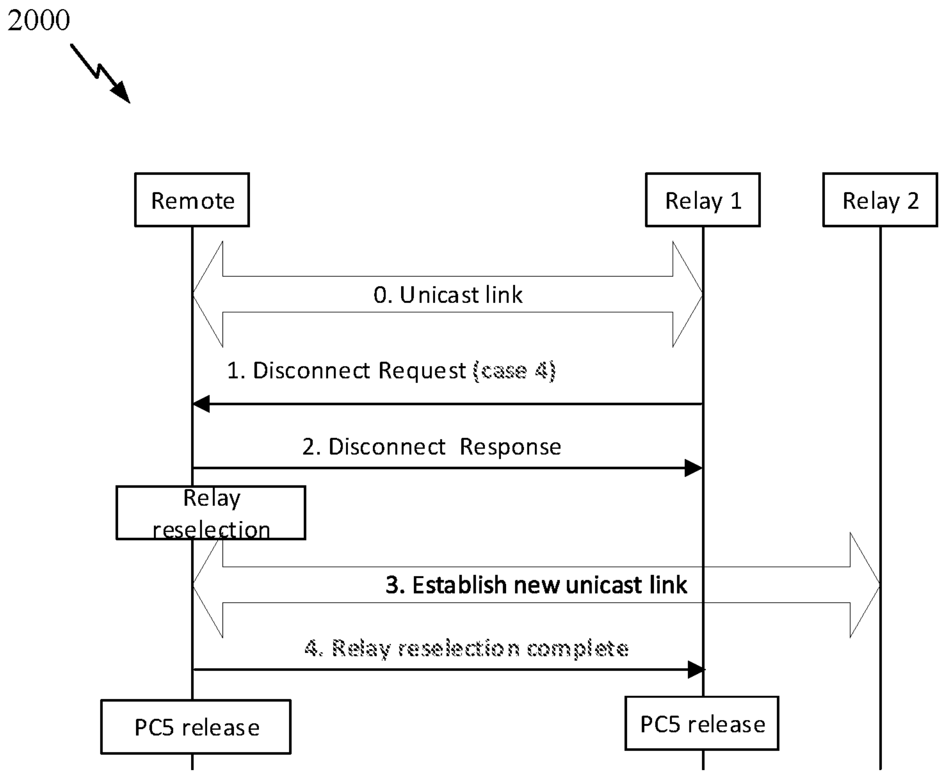
FIG. 20 illustrates example messages that may be exchanged in relay UE-triggered relay reselection and connection release in which relay reselection is performed prior to releasing a sidelink connection, in accordance with certain aspects of the present disclosure.

FIG. 20 illustrates example messages that may be exchanged in relay UE-triggered relay reselection and connection release operations 2000 in which relay reselection is performed prior to releasing a sidelink connection, in accordance with certain aspects of the present disclosure.

As illustrated, operations 2000 may begin with a unicast link having been established between a remote UE and a first relay UE. To trigger the release of a unicast link between the remote UE and a first relay UE, the first relay UE may transmit a disconnect request message (e.g., an L2 connection release message) to the remote UE, and the remote UE may respond with a disconnect response message. In this example, the order of operations may include performing a relay reselection procedure, then release of a unicast link upon completion of the relay reselection procedure, and a field in the disconnect message may indicate this order of operations.

As illustrated, the first relay UE may transmit a disconnect request message to the remote UE, and the remote UE may respond with a disconnect response message. In response, the remote UE may perform a relay reselection procedure which, as illustrated, results in the selection of a second relay UE (i.e., relay 2). Subsequently, the remote UE may establish a new unicast link with the second relay UE and, upon establishing the unicast link between the remote UE and the second relay UE, the remote UE may transmit a relay reselection complete message to the first relay UE. The relay reselection complete message may indicate that the relay reselection procedure is complete. Subsequently, the unicast connection between the remote UE and the first relay UE may be released.

While FIG. 20 illustrates a relay UE-triggered relay reselection and connection release operation, it should be recognized that the remote UE may transmit the disconnect request message using the techniques described above. That is, the remote UE may transmit the disconnect request message including the field that indicates that a relay reselection procedure is to be performed prior to releasing the unicast connection between the remote UE and the first relay UE. Transmission of the disconnect request message by either the remote UE or the relay UE may be triggered by higher layers, as discussed above.

Figure 21:
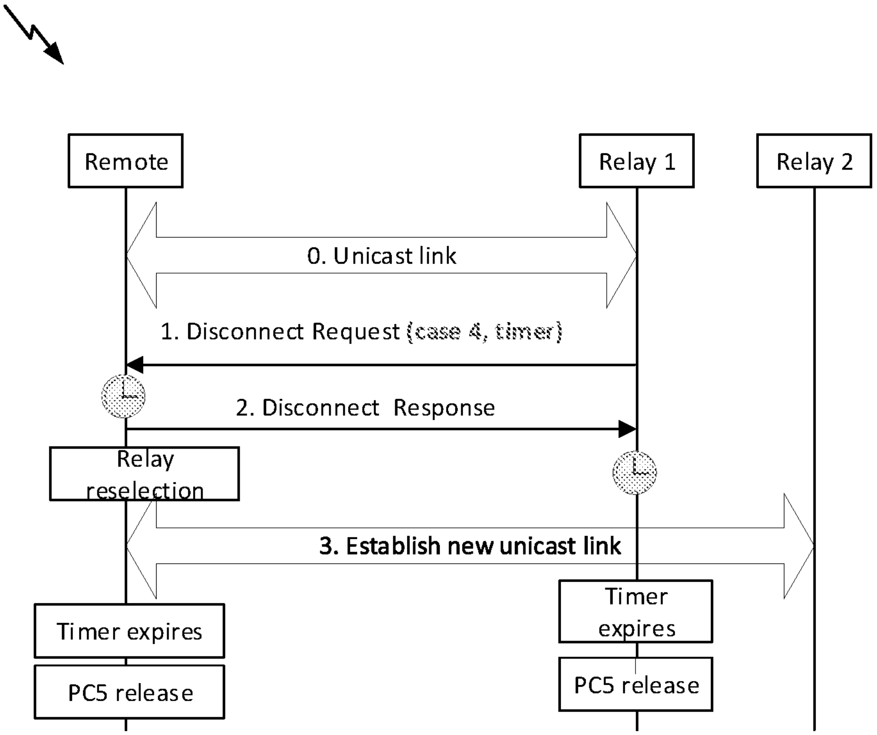
FIG. 21 illustrates example messages that may be exchanged in relay reselection and connection release procedures in which connection release is triggered based on a timer, in accordance with certain aspects of the present disclosure.

FIG. 21 illustrates example messages that may be exchanged in relay reselection and connection release operations 2100 in which connection release is triggered based on a timer, in accordance with certain aspects of the present disclosure.

In operations 2100, the disconnect request message transmitted by the first relay UE to the remote UE may include a timer, the expiry of which may be used to trigger termination of the unicast connection between the remote UE and the first relay UE. At the first relay UE (i.e., the UE that transmits the disconnect request message), the timer may begin upon reception of a disconnect response message from the remote UE; at the remote UE (i.e., the UE that receives the disconnect request message), the timer may begin upon reception of the disconnect request message from the first relay UE. The timer may be set to expire after sufficient time has elapsed for the remote UE to perform a relay reselection procedure and establish a unicast link between the remote UE and a second relay UE (i.e., the relay UE selected during the relay reselection procedure). When the timer expires, the remote UE and first relay UE may perform one or more actions to release the unicast connection between the remote UE and the first relay UE (e.g., deleting context data associated with the unicast connection).

While FIG. 21 illustrates a relay UE-triggered relay reselection and connection release operation, it should be recognized that the remote UE may transmit the disconnect request message using the techniques described above. That is, the remote UE may transmit the disconnect request message including the field that indicates that a relay reselection procedure is to be performed prior to releasing the unicast connection between the remote UE and the first relay UE and the timer discussed above. Transmission of the disconnect request message by either the remote UE or the relay UE may be triggered by higher layers, as discussed above.

As discussed, relay reselection may be triggered by higher layers. For example, relay reselection may be triggered by the occurrence of one or more events at the autonomous system (AS) layer. A remote UE may trigger relay reselection, for example, when a sidelink reference signal received power (RSRP) for a relay node is below a threshold value by some amount (e.g., below q-RxLevMin by minHyst). The triggering of a relay reselection operation may not, however, define when a unicast link between a remote UE and a relay UE is released. The remote UE may, for example, release the unicast link after relay reselection is performed, or may perform relay reselection after the unicast link between the remote UE and the relay UE is released. The order in which relay reselection and sidelink connection release is performed may be preconfigured (e.g., for out-of-coverage (OOC) remote UEs), may be signaled in a system information block (SIB) (e.g., for remote UEs in RRC IDLE or RRC INACTIVE modes), or in radio resource control (RRC) signaling (e.g., for remote UEs in RRC CONNECTED mode).

Figure 22:
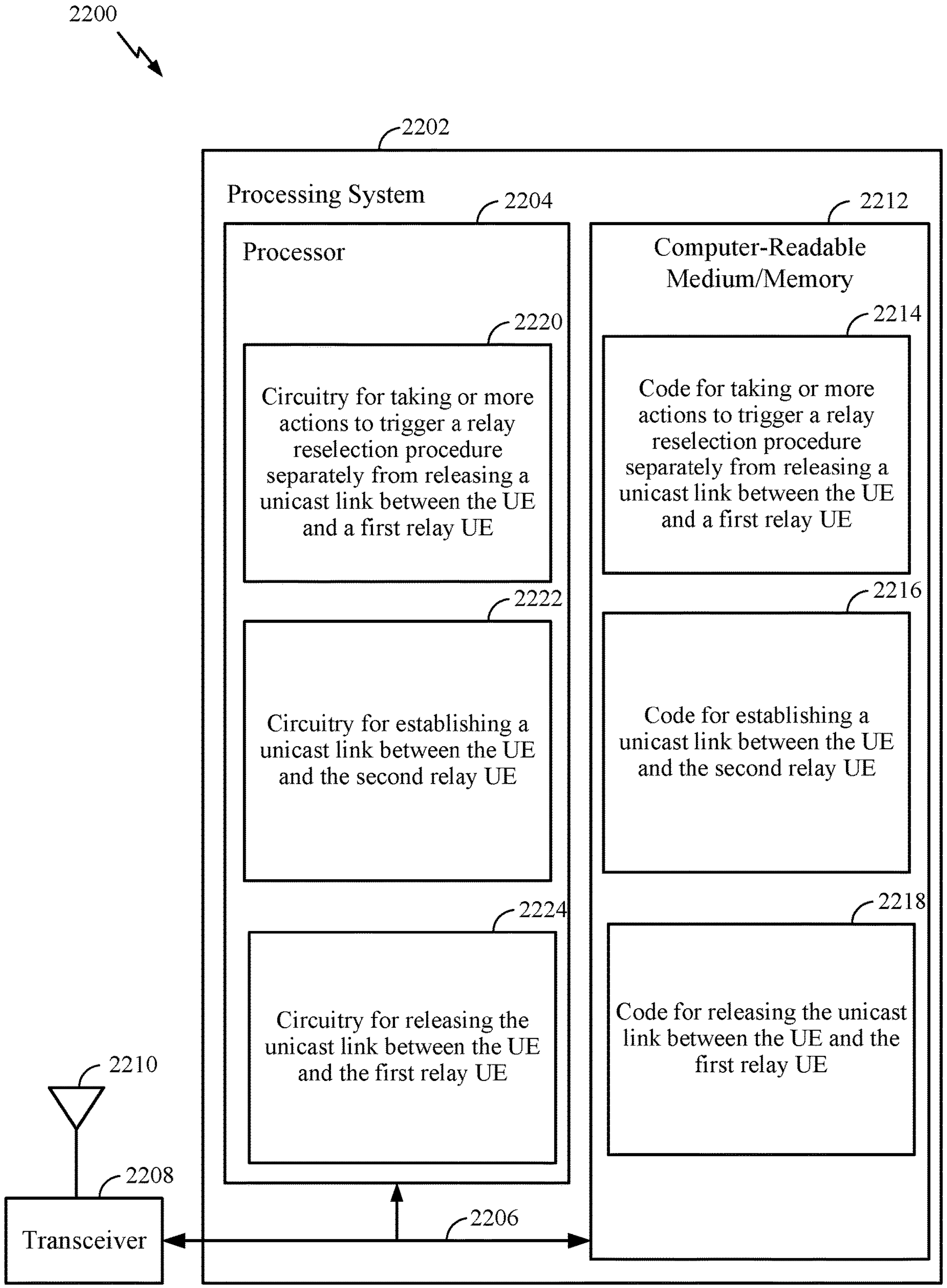
FIG. 22 illustrates a communications device that may include various components configured to perform the operations illustrated in FIG. 15, in accordance with certain aspects of the present disclosure.

FIG. 22 illustrates a communications device 2200 that may include various components (e.g., corresponding to means-plus-function components) configured to perform operations for the techniques disclosed herein, such as the operations illustrated in FIG. 15. The communications device 2200 includes a processing system 2202 coupled to a transceiver 2208. The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIG. 15, or other operations for performing relay selection and reselection separately from releasing communications links between a relay UE and a remote UE. In certain aspects, computer-readable medium/memory 2212 stores code 2214 for taking or more actions to trigger a relay reselection procedure separately from releasing a unicast link between the UE and a first relay UE; code 2216 for establishing a unicast link between the UE and a second relay UE; and code 2218 for releasing the unicast link between the UE and the first relay UE. In certain aspects, the processor 2204 has circuitry configured to implement the code stored in the computer-readable medium/memory 2212. The processor 2204 includes circuitry 2220 for taking or more actions to trigger a relay reselection procedure separately from releasing a unicast link between the UE and a first relay UE; circuitry 2222 for establishing a unicast link between the UE and a second relay UE; and circuitry 2224 for releasing the unicast link between the UE and the first relay UE.

Figure 23:
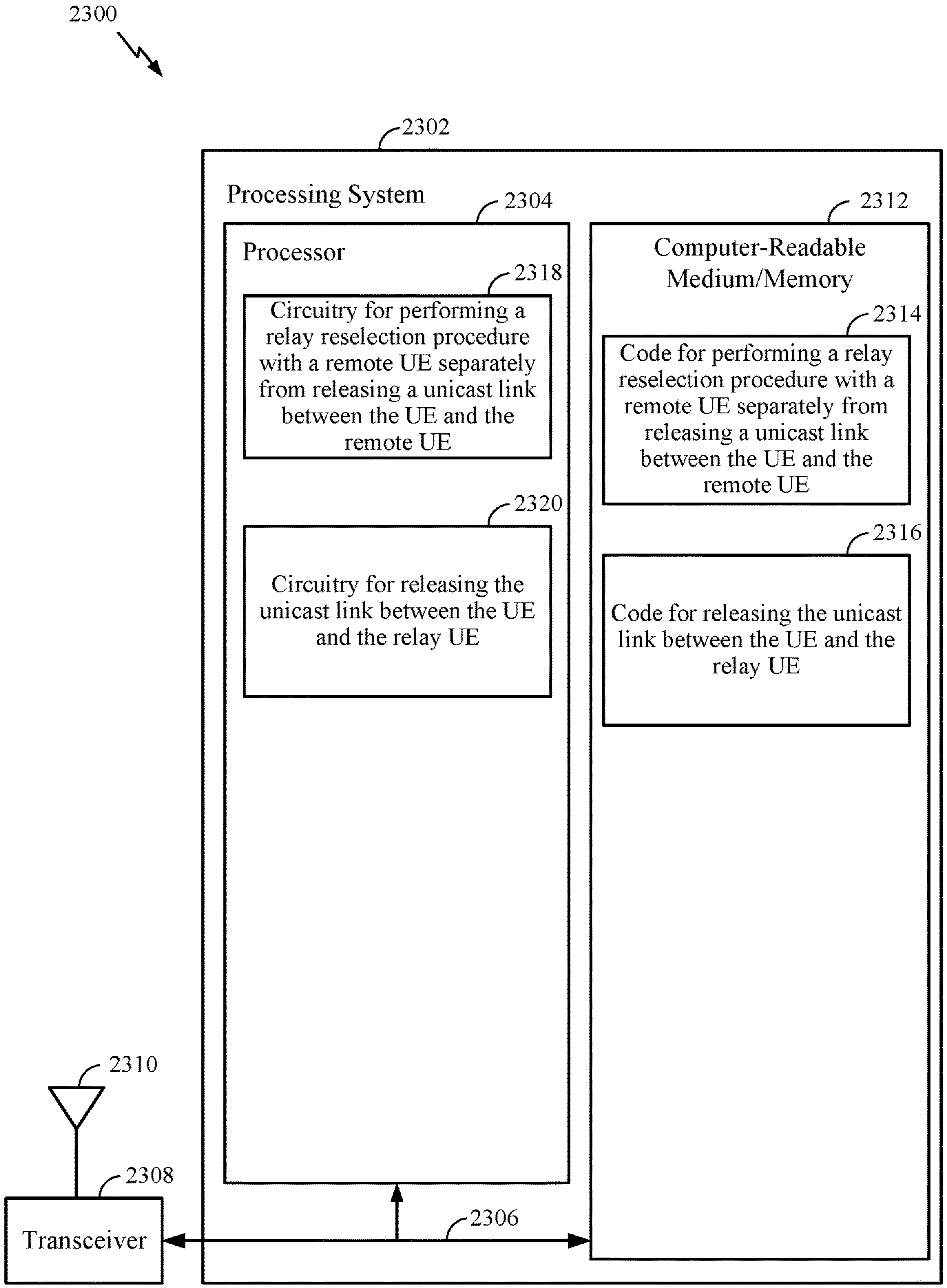
FIG. 23 illustrates a communications device that may include various components configured to perform the operations illustrated in FIG. 16, in accordance with certain aspects of the present disclosure.

FIG. 23 illustrates a communications device 2300 that may include various components (e.g., corresponding to means-plus-function components) configured to perform operations for the techniques disclosed herein, such as the operations illustrated in FIG. 16. The communications device 2300 includes a processing system 2302 coupled to a transceiver 2308. The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer-executable code) that when executed by the processor 2304, cause the processor 2304 to perform the operations illustrated in FIG. 16, or other operations for performing relay selection and reselection separately from releasing communications links between a relay UE and a remote UE, computer-readable medium/memory 2312 stores code 2314 for performing a relay reselection procedure with a remote UE separately from releasing a unicast link between the UE and the remote UE; and code 2316 for releasing the unicast link between the UE and the remote UE. In certain aspects, the processor 2304 has circuitry configured to implement the code stored in the computer-readable medium/memory 2312. The processor 2304 includes circuitry 2318 for performing a relay reselection procedure with a remote UE separately from releasing a unicast link between the UE and the remote UE; circuitry 2320 for releasing the unicast link between the UE and the remote UE.

Example Embodiments

Embodiment 1. A method for wireless communications by a user equipment (UE), comprising: taking or more actions to trigger a relay reselection procedure separately from releasing a unicast link between the UE and a first relay UE; establishing a unicast link between the UE and a second relay UE; and releasing the unicast link between the UE and the first relay UE.

Embodiment 2. The method of Embodiment 1, wherein the relay reselection procedure comprises deselecting the first relay UE and selecting the second relay UE as a relay through which the UE communicates with a network entity.

Embodiment 3. The method of Embodiments 1 or 2, wherein the taking one or more actions to trigger relay reselection comprises exchanging, via the unicast link between the UE and the first relay UE, relay reselection request and relay reselection response messages that trigger the relay reselection procedure.

Embodiment 4. The method of Embodiment 3, wherein exchanging the relay reselection request and relay reselection response messages comprises transmitting the relay reselection request message to the first relay UE and receiving the relay reselection response message from the first relay UE.

Embodiment 5. The method of Embodiment 3, wherein exchanging the relay reselection request and relay reselection response messages comprises receiving the relay reselection request message from the first relay UE and transmitting the relay reselection response message to the first relay UE.

Embodiment 6. The method of any of Embodiments 3 through 5, wherein exchanging the relay reselection request message is triggered by one or more of: radio link failure on the unicast link between the UE and the first relay UE, degradation of link quality of the unicast link between the UE and the first relay UE below a threshold link quality, traffic overload on the unicast link between the UE and the first relay UE, or remaining battery capacity at the UE falling below a threshold level.

Embodiment 7. The method of any of Embodiments 3 through 6, wherein the relay reselection response message indicates whether the relay reselection request was accepted.

Embodiment 8. The method of any of Embodiments 3 through 7, wherein releasing the unicast link between the UE and the first relay UE comprises transmitting a connection release message upon reception of the relay reselection response from the first relay UE.

Embodiment 9. The method of any of Embodiments 3 through 7, wherein releasing the unicast link between the UE and the first relay UE comprises transmitting a connection release message after completion of the relay reselection procedure.

Embodiment 10. The method of any of Embodiments 3 through 9, wherein: the relay reselection request message is carried in a reselection request field in a disconnect request message, and the relay reselection response message is carried in a reselection response field in a disconnect response message.

Embodiment 11. The method of Embodiment 10, wherein a value of the reselection request field indicates whether the disconnect request message is being used to request relay reselection, release of the unicast link between the UE and the first relay UE, or release of the unicast link between the UE and the first relay UE and relay reselection subsequent to release of the unicast link between the UE and the first relay UE.

Embodiment 12. The method of Embodiment 10, wherein a value of the reselection request field indicates that the disconnect request message is being used to request relay reselection and release of the unicast link between the UE and the first relay UE subsequent to relay reselection.

Embodiment 13. The method of Embodiment 12, further comprising: upon completing the relay reselection procedure, transmitting a relay reselection complete message to the first relay UE prior to releasing the unicast link between the UE and the first relay UE.

Embodiment 14. The method of Embodiments 12 or 13, wherein the relay reselection request message includes a timer that triggers release of the unicast link between the UE and the first relay UE upon expiry such that the unicast link between the UE and the second relay UE is established before the unicast link between the UE and the first relay UE is released.

Embodiment 15. The method of any of Embodiments 1 through 14, wherein relay reselection procedure is triggered based on determining that a signal strength of the unicast link between the UE and the first relay UE is less than a threshold signal strength.

Embodiment 16. The method of Embodiment 15, wherein releasing the unicast link between the UE and the first relay UE is performed after performing the relay reselection procedure.

Embodiment 17. The method of Embodiment 15, wherein releasing the unicast link between the UE and the first relay UE is performed prior to performing the relay reselection procedure.

Embodiment 18. The method of Embodiment 15, wherein an order in which releasing the unicast link between the UE and the first relay UE and the relay reselection procedure is performed is indicated in one or more of a system information block (SIB) or in radio resource control (RRC) signaling.

Embodiment 19. The method of Embodiment 15, wherein an order in which releasing the unicast link between the UE and the first relay UE and the relay reselection procedure is performed comprises a preconfigured order.

Embodiment 20. A method for wireless communications by a user equipment (UE), comprising: performing a relay reselection procedure with a remote UE separately from releasing a unicast link between the UE and the remote UE; and releasing the unicast link between the UE and the remote UE.

Embodiment 21. The method of Embodiment 20, wherein the relay reselection procedure causes the remote UE to deselect the UE and select another UE as a relay through which the remote UE communicates with a network entity.

Embodiment 22. The method of Embodiments 20 or 21, wherein performing the relay reselection procedure comprises exchanging relay reselection request and relay reselection response messages via the unicast link between the UE and the remote UE.

Embodiment 23. The method of Embodiment 22, wherein exchanging the relay reselection request and relay reselection response messages comprises receiving the relay reselection request message from the remote UE and transmitting the relay reselection response message to the remote UE.

Embodiment 24. The method of Embodiment 22, wherein exchanging the relay reselection request and relay reselection response messages comprises transmitting the relay reselection request message to the remote UE and receiving the relay reselection response message from the remote UE.

Embodiment 25. The method of any of Embodiments 22 through 24, wherein exchanging the relay reselection request message is triggered by one or more of: radio link failure on the unicast link between the UE and the relay UE, degradation of link quality of the unicast link between the UE and the relay UE below a threshold link quality, traffic overload on the unicast link between the UE and the relay UE, or remaining battery capacity at the UE falling below a threshold level.

Embodiment 26. The method of any of Embodiments 22 through 25, wherein the relay reselection response message indicates whether the relay reselection request was accepted.

Embodiment 27. The method of any of Embodiments 22 through 26, wherein releasing the unicast link between the UE and the remote UE comprises receiving a connection release message upon transmission of the relay reselection response to the remote UE.

Embodiment 28. The method of Embodiments 22 through 26, wherein releasing the unicast link between the UE and the remote UE comprises receiving a connection release message after completion of the relay reselection procedure.

Embodiment 29. The method of Embodiments 22 through 28, wherein: the relay reselection request message is carried in a reselection request field in a disconnect request message, and the relay reselection response message is carried in a reselection response field in a disconnect response message.

Embodiment 30. The method of Embodiment 29, wherein a value of the reselection request field indicates whether the disconnect request message is being used to request relay reselection, release of the unicast link between the UE and the remote UE, or release of the unicast link between the UE and the remote UE and relay reselection subsequent to release of the unicast link between the UE and the remote UE.

Embodiment 31. The method of Embodiment 29, wherein a value of the reselection request field indicates that the disconnect request message is being used to request relay reselection and release of the unicast link between the UE and the remote UE subsequent to relay reselection.

Embodiment 32. The method of Embodiment 31, further comprising: receiving, from the remote UE, a relay reselection complete message prior to releasing the unicast link between the UE and the remote UE.

Embodiment 33. The method of Embodiments 31 or 32, wherein the relay reselection request message includes a timer that triggers release of the unicast link between the UE and the remote UE upon expiry.

Embodiment 34. The method of any of Embodiments 20 through 33, wherein the relay reselection procedure is triggered based on determining that a signal strength of the unicast link between the UE and the first relay UE is less than a threshold signal strength.

Embodiment 35. The method of any of Embodiments 20 through 34, wherein an order in which releasing the unicast link between the UE and the remote UE and the relay reselection procedure is performed is indicated to the remote UE in one or more of a system information block (SIB) or in radio resource control (RRC) signaling.

Embodiment 36. The method of any of Embodiments 20 through 34, wherein an order in which releasing the unicast link between the UE and the remote UE and the relay reselection procedure is performed comprises a preconfigured order.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 15 and 16 may be performed by various processors shown in FIG. 4, such as processors 466, 458, 464, and/or controller/processor 480 of the UE 120*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 15, 16, and 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:

taking one or more actions to trigger a relay reselection procedure separately from releasing a unicast link between the UE and a first relay UE, wherein:

taking one or more actions to trigger relay reselection comprises exchanging, via the unicast link between the UE and the first relay UE, relay reselection request and relay reselection response messages that trigger the relay reselection procedure; and the relay reselection response message indicates whether the relay reselection request was accepted;

establishing a unicast link between the UE and a second relay UE; and releasing the unicast link between the UE and the first relay UE, wherein an order in which the releasing the unicast link between the UE and the first relay UE and the relay reselection procedure is performed is at least one of:

indicated in one or more of a system information block (SIB) or in radio resource control (RRC) signaling; or a preconfigured order.

2. The method of claim 1, wherein the relay reselection procedure comprises deselecting the first relay UE and selecting the second relay UE as a relay through which the UE communicates with a network entity.

3. The method of claim 1, wherein exchanging the relay reselection request and relay reselection response messages comprises transmitting the relay reselection request message to the first relay UE and receiving the relay reselection response message from the first relay UE.

4. The method of claim 1, wherein exchanging the relay reselection request and relay reselection response messages comprises receiving the relay reselection request message from the first relay UE and transmitting the relay reselection response message to the first relay UE.

5. The method of claim 1, wherein exchanging the relay reselection request message is triggered by one or more of: radio link failure on the unicast link between the UE and the first relay UE, degradation of link quality of the unicast link between the UE and the first relay UE below a threshold link quality, traffic overload on the unicast link between the UE and the first relay UE, or remaining battery capacity at the UE falling below a threshold level.

6. The method of claim 1, wherein releasing the unicast link between the UE and the first relay UE comprises transmitting a connection release message upon reception of the relay reselection response from the first relay UE.

7. The method of claim 1, wherein releasing the unicast link between the UE and the first relay UE comprises transmitting a connection release message after completion of the relay reselection procedure.

8. The method of claim 1, wherein:

the relay reselection request message is carried in a reselection request field in a disconnect request message, and the relay reselection response message is carried in a reselection response field in a disconnect response message.

9. The method of claim 8, wherein a value of the reselection request field indicates whether the disconnect request message is being used to request relay reselection, release of the unicast link between the UE and the first relay UE, or release of the unicast link between the UE and the first relay UE and relay reselection subsequent to release of the unicast link between the UE and the first relay UE.

10. The method of claim 8, wherein a value of the reselection request field indicates that the disconnect request message is being used to request relay reselection and release of the unicast link between the UE and the first relay UE subsequent to relay reselection.

11. The method of claim 10, further comprising:

upon completing the relay reselection procedure, transmitting a relay reselection complete message to the first relay UE prior to releasing the unicast link between the UE and the first relay UE.

12. The method of claim 10, wherein the relay reselection request message includes a timer that triggers release of the unicast link between the UE and the first relay UE upon expiry such that the unicast link between the UE and the second relay UE is established before the unicast link between the UE and the first relay UE is released.

13. The method of claim 1, wherein relay reselection procedure is triggered based on determining that a signal strength of the unicast link between the UE and the first relay UE is less than a threshold signal strength.

14. The method of claim 13, wherein releasing the unicast link between the UE and the first relay UE is performed after performing the relay reselection procedure.

15. The method of claim 13, wherein releasing the unicast link between the UE and the first relay UE is performed prior to performing the relay reselection procedure.

16. A method for wireless communications by a user equipment (UE), comprising:

performing a relay reselection procedure with a remote UE separately from releasing a unicast link between the UE and the remote UE, wherein:

performing the relay reselection procedure comprises exchanging relay reselection request and relay reselection response messages via the unicast link between the UE and the remote UE; and the relay reselection response message indicates whether the relay reselection request was accepted; and releasing the unicast link between the UE and the remote UE, wherein an order in which the releasing the unicast link between the UE and the remote UE and the relay reselection procedure is performed is at least one of:

indicated in one or more of a system information block (SIB) or in radio resource control (RRC) signaling; or a preconfigured order.

17. The method of claim 16, wherein the relay reselection procedure causes the remote UE to deselect the UE and select another UE as a relay through which the remote UE communicates with a network entity.

18. The method of claim 16, wherein exchanging the relay reselection request and relay reselection response messages comprises receiving the relay reselection request message from the remote UE and transmitting the relay reselection response message to the remote UE.

19. The method of claim 16, wherein exchanging the relay reselection request and relay reselection response messages comprises transmitting the relay reselection request message to the remote UE and receiving the relay reselection response message from the remote UE.

20. The method of claim 16, wherein exchanging the relay reselection request message is triggered by one or more of: radio link failure on the unicast link between the UE and the remote UE, degradation of link quality of the unicast link between the UE and the remote UE below a threshold link quality, traffic overload on the unicast link between the UE and the remote UE, or remaining battery capacity at the UE falling below a threshold level.

21. The method of claim 16, wherein releasing the unicast link between the UE and the remote UE comprises receiving a connection release message upon transmission of the relay reselection response to the remote UE.

22. The method of claim 16, wherein releasing the unicast link between the UE and the remote UE comprises receiving a connection release message after completion of the relay reselection procedure.

23. The method of claim 16, wherein:

the relay reselection request message is carried in a reselection request field in a disconnect request message, and the relay reselection response message is carried in a reselection response field in a disconnect response message.

24. The method of claim 23, wherein a value of the reselection request field indicates whether the disconnect request message is being used to request relay reselection, release of the unicast link between the UE and the remote UE, or release of the unicast link between the UE and the remote UE and relay reselection subsequent to release of the unicast link between the UE and the remote UE.

25. The method of claim 23, wherein a value of the reselection request field indicates that the disconnect request message is being used to request relay reselection and release of the unicast link between the UE and the remote UE subsequent to relay reselection.

26. The method of claim 25, further comprising:

receiving, from the remote UE, a relay reselection complete message prior to releasing the unicast link between the UE and the remote UE.

27. The method of claim 25, wherein the relay reselection request message includes a timer that triggers release of the unicast link between the UE and the remote UE upon expiry.

28. The method of claim 16, wherein the relay reselection procedure is triggered based on determining that a signal strength of the unicast link between the UE and the remote UE is less than a threshold signal strength.

29. An apparatus for wireless communications by a user equipment (UE), comprising:
one or more memories including executable instructions; and
one or more processors configured to execute the executable instructions to cause the UE to:
take one or more actions to trigger a relay reselection procedure separately from releasing a unicast link between the UE and a first relay UE, wherein:
to take the one or more actions to trigger relay reselection, the one or more processors are configured to cause the UE to exchange, via the unicast link between the UE and the first relay UE, relay reselection request and relay reselection response messages that trigger the relay reselection procedure; and
the relay reselection response message indicates whether the relay reselection request was accepted;
establish a unicast link between the UE and a second relay UE;
release the unicast link between the UE and the first relay UE, wherein an order in which the release of the unicast link between the UE and the first relay UE and the relay reselection procedure is performed is at least one of:
indicated in one or more of a system information block (SIB) or in radio resource control (RRC) signaling; or
a preconfigured order.

30. The apparatus of claim 29, wherein, to perform the relay reselection procedure, the one or more processors are configured to cause the UE to deselect the first relay UE and select the second relay UE as a relay through which the UE communicates with a network entity.

31. The apparatus of claim 29, wherein, to exchange the relay reselection request and relay reselection response messages, the one or more processors are configured to cause the UE to transmit the relay reselection request message to the first relay UE and receive the relay reselection response message from the first relay UE.

32. The apparatus of claim 29, wherein, to exchange the relay reselection request and relay reselection response messages, the one or more processors are configured to cause the UE to receive the relay reselection request message from the first relay UE and transmit the relay reselection response message to the first relay UE.

33. The apparatus of claim 29, wherein the one or more processors are configured to cause the UE to exchange the relay reselection request message based on one or more of: radio link failure on the unicast link between the UE and the first relay UE, degradation of link quality of the unicast link between the UE and the first relay UE below a threshold link quality, traffic overload on the unicast link between the UE and the first relay UE, or remaining battery capacity at the UE falling below a threshold level.

34. The apparatus of claim 29, wherein, in order to release the unicast link between the UE and the first relay UE, the one or more processors are configured to cause the UE to transmit a connection release message upon reception of the relay reselection response from the first relay UE.

35. The apparatus of claim 29, wherein, to release the unicast link between the UE and the first relay UE, the one or more processors are configured to cause the UE to transmit a connection release message after completion of the relay reselection procedure.

36. The apparatus of claim 29, wherein:
the relay reselection request message is carried in a reselection request field in a disconnect request message, and
the relay reselection response message is carried in a reselection response field in a disconnect response message.

37. The apparatus of claim 36, wherein a value of the reselection request field indicates whether the disconnect request message is used to request relay reselection, release of the unicast link between the UE and the first relay UE, or release of the unicast link between the UE and the first relay UE and relay reselection subsequent to release of the unicast link between the UE and the first relay UE.

38. The apparatus of claim 36, wherein a value of the reselection request field indicates that the disconnect request message is used to request relay reselection and release of the unicast link between the UE and the first relay UE subsequent to relay reselection.

39. The apparatus of claim 38, wherein the one or more processors are further configured to cause the UE to transmit, upon completing the relay reselection procedure, a relay reselection complete message to the first relay UE prior to the release of the unicast link between the UE and the first relay UE.

40. The apparatus of claim 38, wherein the relay reselection request message includes a timer that triggers release of the unicast link between the UE and the first relay UE upon expiry such that the unicast link between the UE and the second relay UE is established before the unicast link between the UE and the first relay UE is released.

41. The apparatus of claim 29, wherein:
the one or more processors are further configured to cause the UE to determine that a signal strength of the unicast link between the UE and the first relay UE is less than a threshold signal strength; and
the relay reselection procedure is triggered based on the determination.

42. The apparatus of claim 41, wherein the one or more processors are configured to cause the UE to release the unicast link between the UE and the first relay UE after performing the relay reselection procedure.

43. The apparatus of claim 41, wherein the one or more processors are configured to cause the UE to release the unicast link between the UE and the first relay UE prior to performing the relay reselection procedure.

44. An apparatus for wireless communications by a user equipment (UE), comprising:
one or more memories including executable instructions; and
one or more processors configured to execute the executable instructions to cause the UE to:
perform a relay reselection procedure with a remote UE separately from releasing a unicast link between the UE and the remote UE, wherein:
in order to perform the relay reselection procedure, the one or more processors are configured to cause the UE to exchange relay reselection request and relay reselection response messages via the unicast link between the UE and the remote UE; and
the relay reselection response message indicates whether the relay reselection request was accepted;

release the unicast link between the UE and the remote UE, wherein an order in which the release of the unicast link between the UE and the remote UE and the relay reselection procedure is performed is at least one of:

indicated in one or more of a system information block (SIB) or in radio resource control (RRC) signaling; or a preconfigured order.

45. The apparatus of claim 44, wherein, to exchange the relay reselection request and relay reselection response messages, the one or more processors are configured to cause the UE to receive the relay reselection request message from the remote UE and transmit the relay reselection response message to the remote UE.

46. The apparatus of claim 44, wherein, to exchange the relay reselection request and relay reselection response messages, the one or more processors are configured to cause the UE to transmit the relay reselection request message to the remote UE and receive the relay reselection response message from the remote UE.

47. The apparatus of claim 44, wherein the one or more processors are configured to cause the UE to exchange the relay reselection request message based on one or more of: radio link failure on the unicast link between the UE and the remote UE, degradation of link quality of the unicast link between the UE and the remote UE below a threshold link quality, traffic overload on the unicast link between the UE and the remote UE, or remaining battery capacity at the UE falling below a threshold level.

48. The apparatus of claim 44, wherein, to release the unicast link between the UE and the remote UE, the one or more processors are configured to cause the UE to receive a connection release message upon transmission of the relay reselection response to the remote UE.

49. The apparatus of claim 44, wherein, to release the unicast link between the UE and the remote UE, the one or more processors are configured to cause the UE to receive a connection release message after completion of the relay reselection procedure.

50. The apparatus of claim 44, wherein:

the relay reselection request message is carried in a reselection request field in a disconnect request message, and the relay reselection response message is carried in a reselection response field in a disconnect response message.

51. The apparatus of claim 50, wherein a value of the reselection request field indicates whether the disconnect request message is used to request relay reselection, release of the unicast link between the UE and the remote UE, or release of the unicast link between the UE and the remote UE and relay reselection subsequent to release of the unicast link between the UE and the remote UE.

52. The apparatus of claim 50, wherein a value of the reselection request field indicates that the disconnect request message is used to request relay reselection and release of the unicast link between the UE and the remote UE subsequent to relay reselection.

53. The apparatus of claim 52, wherein the one or more processors are further configured to cause the UE to receive, from the remote UE, a relay reselection complete message prior to releasing the unicast link between the UE and the remote UE.

54. The apparatus of claim 52, wherein the relay reselection request message includes a timer that triggers release of the unicast link between the UE and the remote UE upon expiry.

55. The apparatus of claim 44, wherein:

the one or more processors are further configured to cause the UE to determine the relay reselection procedure is triggered based on determining that a signal strength of the unicast link between the UE and the remote UE is less than a threshold signal strength; and the relay reselection procedure is triggered based on the determination.

56. An apparatus for wireless communications by a user equipment (UE), comprising:

means for taking one or more actions to trigger a relay reselection procedure separately from releasing a unicast link between the UE and a first relay UE, wherein:

the means for taking one or more actions to trigger relay reselection comprises means for exchanging, via the unicast link between the UE and the first relay UE, relay reselection request and relay reselection response messages that trigger the relay reselection procedure; and the relay reselection response message indicates whether the relay reselection request was accepted;

means for establishing a unicast link between the UE and a second relay UE; and means for releasing the unicast link between the UE and the first relay UE, wherein an order in which the release of the unicast link between the UE and the first relay UE and the relay reselection procedure is performed is at least one of:

indicated in one or more of a system information block (SIB) or in radio resource control (RRC) signaling; or a preconfigured order.

57. An apparatus for wireless communications by a user equipment (UE), comprising:

means for performing a relay reselection procedure with a remote UE separately from releasing a unicast link between the UE and the remote UE, wherein:

the means for performing the relay reselection procedure comprises means for exchanging relay reselection request and relay reselection response messages via the unicast link between the UE and the remote UE; and the relay reselection response message indicates whether the relay reselection request was accepted;

means for releasing the unicast link between the UE and the remote UE, wherein an order in which the release of the unicast link between the UE and the remote UE and the relay reselection procedure is performed is at least one of:

indicated in one or more of a system information block (SIB) or in radio resource control (RRC) signaling; or a preconfigured order.

* * * * *